(12) United States Patent
Yasuda

(10) Patent No.: US 8,244,423 B2
(45) Date of Patent: Aug. 14, 2012

(54) VEHICLE ELECTRONIC CONTROL SYSTEM, VEHICLE ELECTRONIC CONTROL UNIT, AND VEHICLE CONTROL SYNCHRONIZATION METHOD

(75) Inventor: Takeshi Yasuda, Kuwana (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/141,563

(22) PCT Filed: Dec. 22, 2008

(86) PCT No.: PCT/JP2008/073341
§ 371 (c)(1),
(2), (4) Date: Jun. 22, 2011

(87) PCT Pub. No.: WO2010/073312
PCT Pub. Date: Jul. 1, 2010

(65) Prior Publication Data
US 2011/0320079 A1  Dec. 29, 2011

(51) Int. Cl.
*B60L 9/00* (2006.01)
(52) U.S. Cl. .......... 701/22; 701/34.3; 701/34.4; 701/36; 700/2
(58) Field of Classification Search ................ 701/29.7, 701/34.3, 34.4, 36; 700/2, 8, 79
See application file for complete search history.

(56) References Cited

U.S. PATENT DOCUMENTS

| 5,682,480 A | 10/1997 | Nakagawa | |
|---|---|---|---|
| 6,493,593 B1 * | 12/2002 | Kamiya et al. | 700/2 |
| 2003/0135651 A1 | 7/2003 | Ebihara | |
| 2005/0216135 A1 * | 9/2005 | Sayama et al. | 701/1 |

FOREIGN PATENT DOCUMENTS

| JP | 63 40959 | 2/1988 |
|---|---|---|
| JP | 7 141307 | 6/1995 |
| JP | 8 110894 | 4/1996 |
| JP | 8 235001 | 9/1996 |
| JP | 2000 10806 | 1/2000 |
| JP | 2003 141095 | 5/2003 |
| JP | 2005 71280 | 3/2005 |
| JP | 2006 228192 | 8/2006 |
| JP | 2007 34910 | 2/2007 |

OTHER PUBLICATIONS

International Search Report Issued Jan. 27, 2009 in PCT/JP08/073341 filed Dec. 22, 2008.

* cited by examiner

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

A vehicle electronic control system includes a first electronic control unit that completes execution of a first control process in a predetermined time, and a second electronic control unit connected to the first electronic control unit that executes a second control process inseparable from the first control process. The first electronic control unit transmits a synchronization signal at periods sufficiently less than the predetermined time. The second electronic control unit starts execution of the second control process with reference to the synchronization signal received.

19 Claims, 18 Drawing Sheets

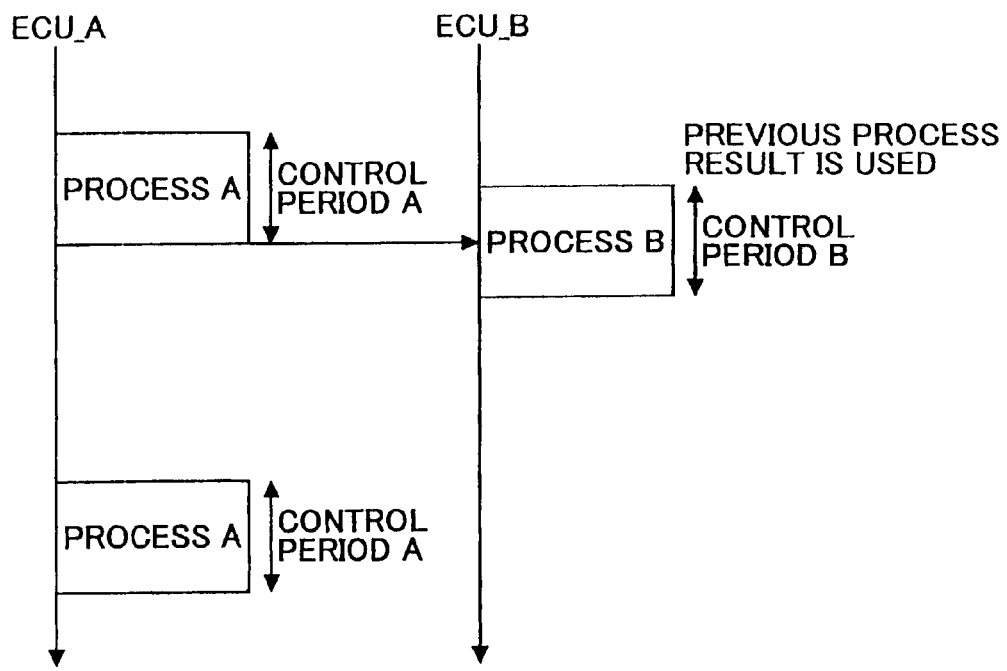
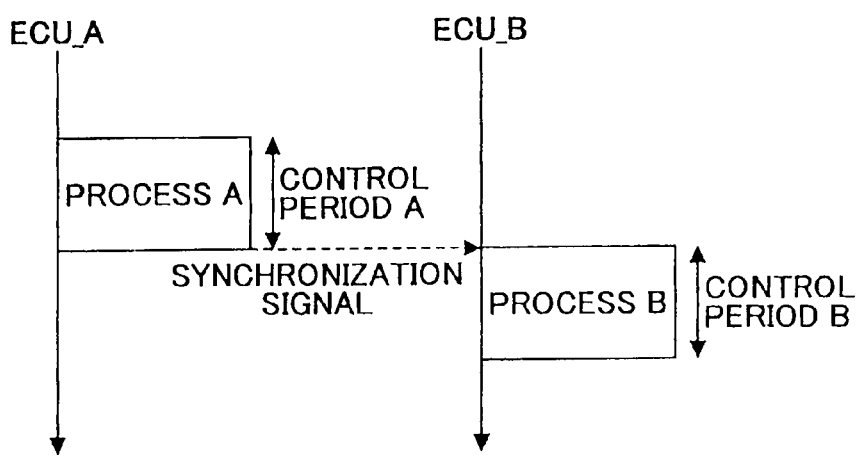

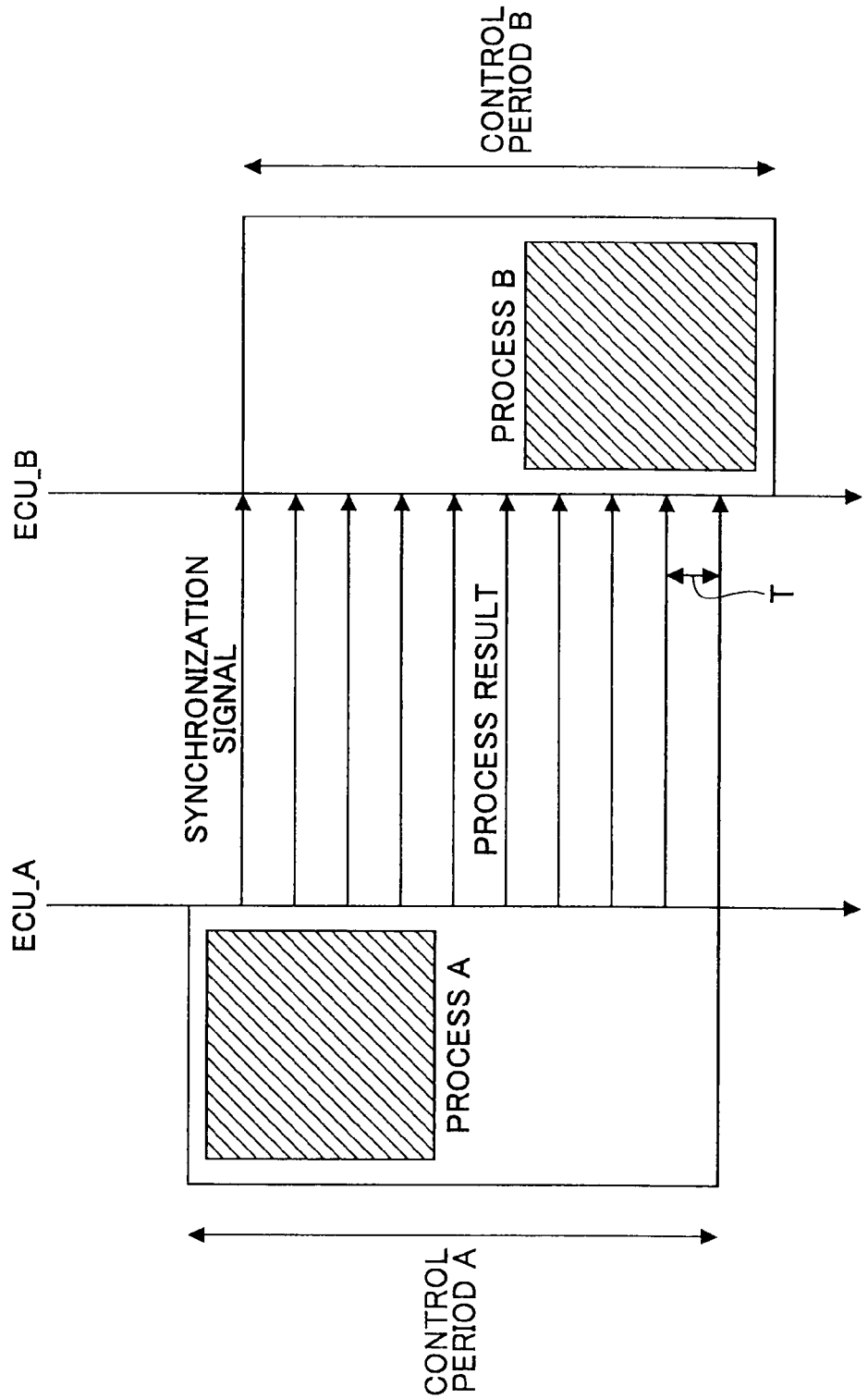

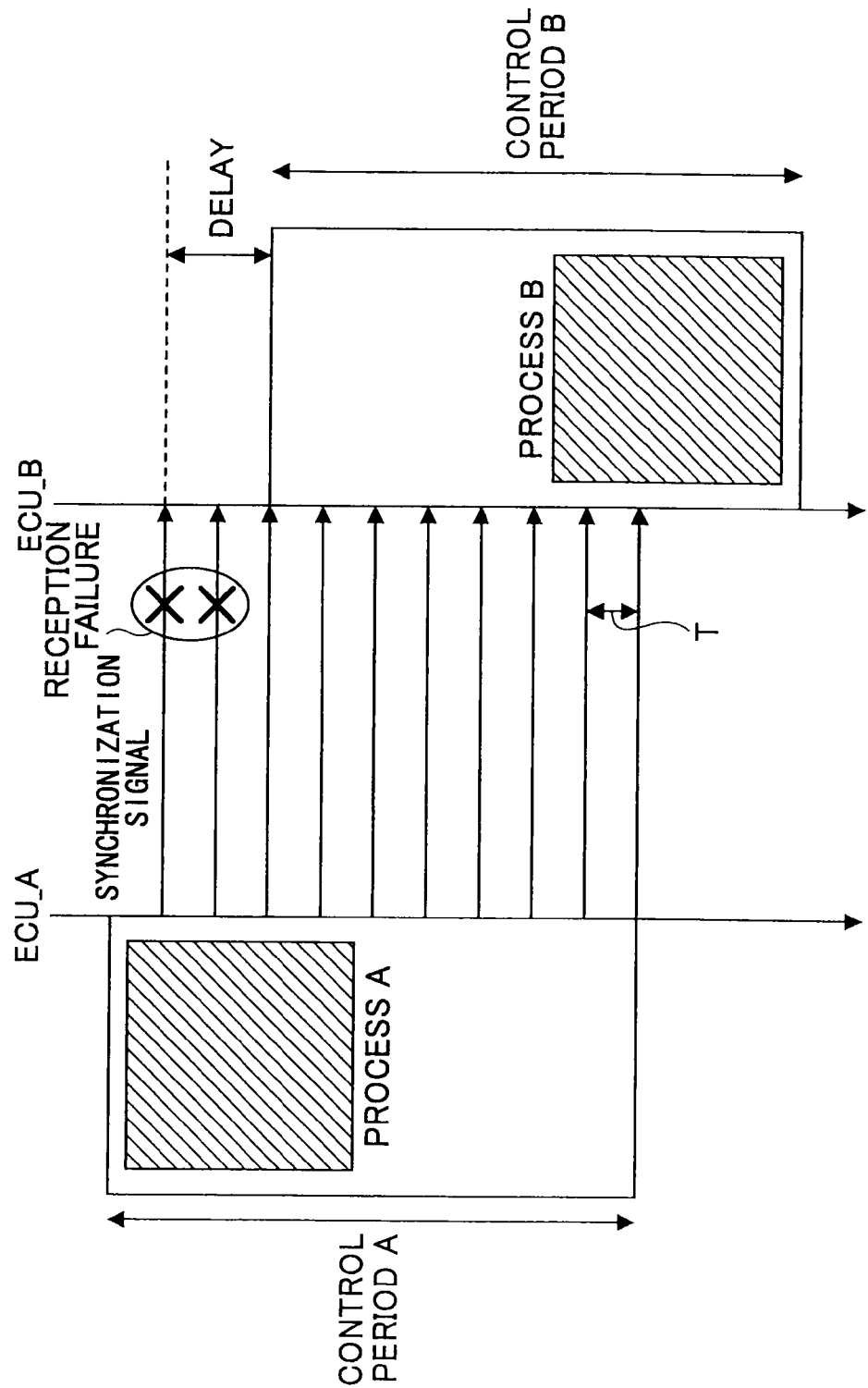

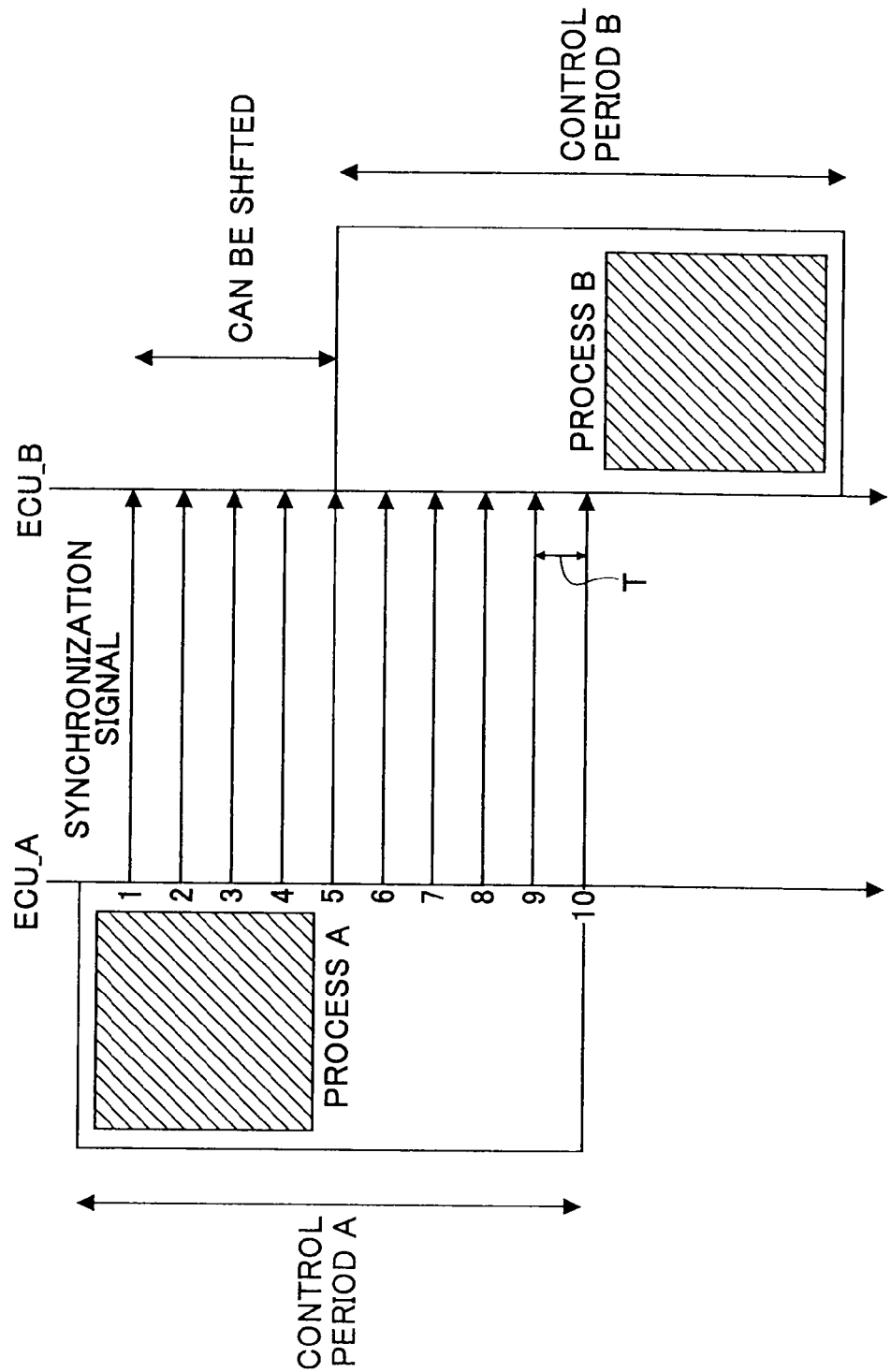

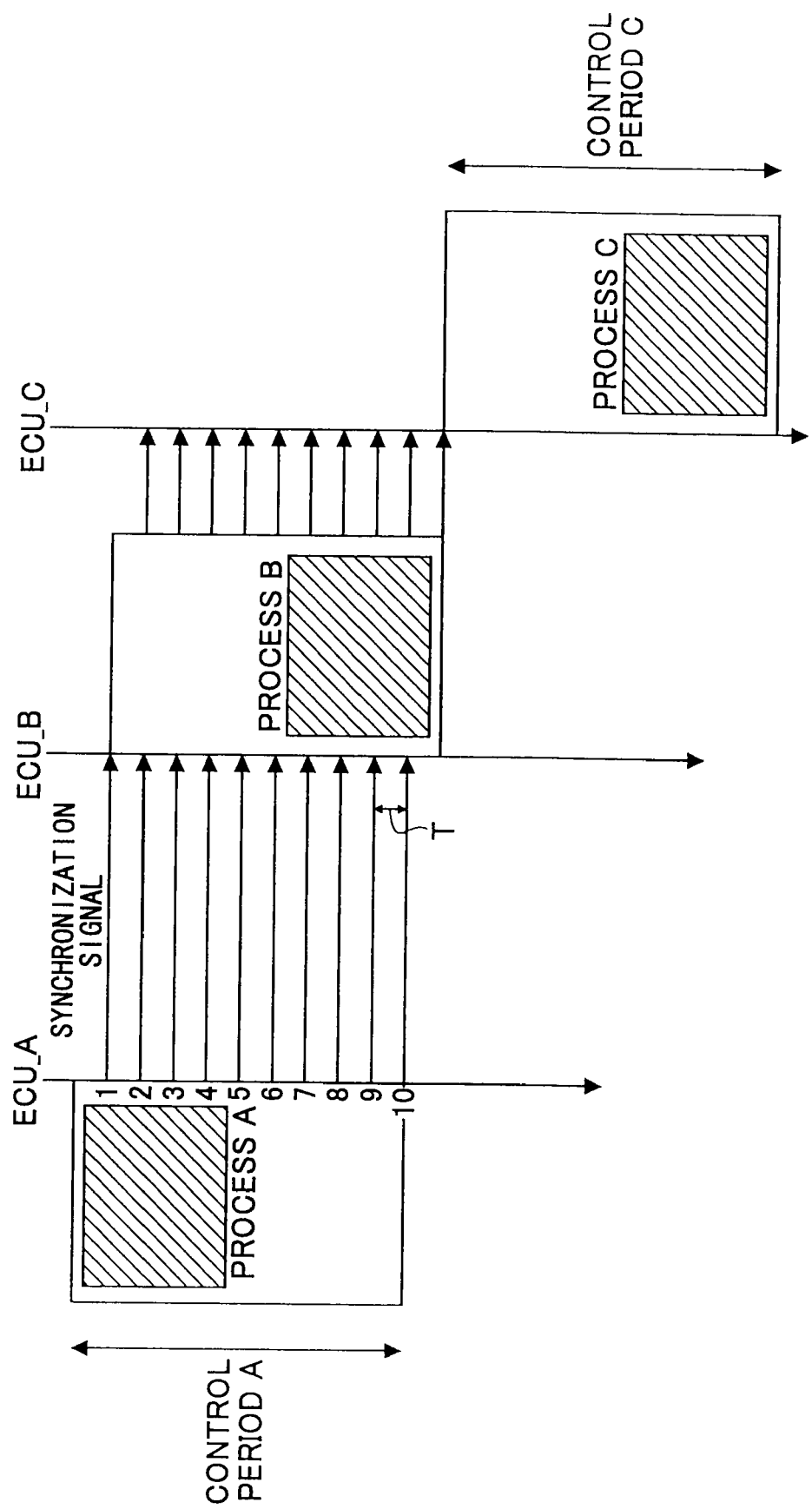

VEHICLE ELECTRONIC CONTROL SYSTEM, VEHICLE ELECTRONIC CONTROL UNIT, AND VEHICLE CONTROL SYNCHRONIZATION METHOD

TECHNICAL FIELD

The present invention relates to a vehicle electronic control system and the like in which plural electronic control units are connected. Particularly, the present invention relates to a vehicle electronic control system, a vehicle electronic control unit, and a vehicle control synchronization method whereby closely related processes are executed by separate electronic control units.

BACKGROUND ART

An electronic control unit ("ECU") mounted on a vehicle is required to control increasingly sophisticated and complicated functions, and it is becoming increasingly difficult to implement all of the required functions on a single ECU. Thus, the need is increasing for executing processes which are originally preferably executed by a single ECU by separate ECUs. However, two processes obtained by dividing processes that are preferably executed by a single ECU need to be synchronized because the processes are closely related to each other.

FIG. 1 illustrates an example of synchronization of two processes. FIG. 1A illustrates a chronological relationship of two processes A and B executed by a single ECU. Because the process A and the process B are closely related to each other, the ECU executes the process A and then starts execution of the process B (after a minimum required time for switching of the processes, for example). For example, the ECU controls an actuator A based on a result of the process A and then controls a related actuator B based on a result of the process B. In this way, the two actuators are controlled in a coordinated manner. Predetermined times (which may be referred to as "control periods") are allocated to the processes A and B. Namely, a sufficient time for the process A is allocated to a control period A, and a sufficient time for the process B is allocated to a control period B.

FIGS. 1B and 1C illustrate examples of a chronological relationship between the processes A and B where the process A is processed by an ECU_A and the process B is processed by an ECU_B. The ECU_A and the ECU_B are electrically connected to each other. Unless the processes are synchronized between the ECU_A and the ECU_B, a desired chronological relationship between the processes A and B may be broken. For example, a blank time may arise between completion of the process A and the start of the process B (FIG. 1B), or the process B may be started when the process A is not yet completed (FIG. 1C). For example, in the former case, control of an actuator B after the control of an actuator A is delayed. In the latter case, the actuator B may not be properly controlled because the process B is controlled based on the result of the previous process A. Thus, in either case, the actuators A and B cannot be controlled in a smoothly coordinated manner.

Regarding synchronization of processes, a technology has been devised whereby, in a clustered computer system including plural computers, one computer notifies another computer of the start and end of a session in an asynchronous manner (see Patent Document 1, for example). Specifically, a master computer notifies a slave computer of the start and end timings of a parallel process portion.

However, when process synchronization is based on such simple notification, according to the synchronization technology discussed in Patent Document 1, it becomes difficult to synchronize plural computers simply due to the occurrence of communication error at the time of notification.

FIG. 2(a) illustrates an example of a synchronization signal transmitted from the ECU_A to the ECU_B. The ECU_A transmits the synchronization signal to the ECU_B at around the time of completion of the process A. The ECU_B can start execution of the process B by using the synchronization signal as a trigger.

However, communication error may be caused or an interrupt with high priority may be issued during the communication of the synchronization signal, so that the ECU_B may not be able to receive the synchronization signal at all times. If a communication error is caused as illustrated in FIG. 2B, the ECU_B cannot start the process B and has to wait until the ECU_A executes the next process A and transmits the synchronization signal to the ECU_B. Namely, when such a communication error is caused, at least one control period is skipped by the ECU_B. As a result, control of the actuator B is destabilized.

Thus, in the method according to the related art, it has been difficult to synchronize two closely related processes so that the processes can be controlled in a synchronized manner. In this respect, skipping of the process of the ECU_B once may not cause much of a problem in the case of a simple information process not related to control. Further, the problem has not been felt in the related art because there has been a time allowance for the ECU_A to re-transmit the synchronization signal upon detection of communication error.

Patent Document 1: Japanese Laid-open Patent Publication No. 2006-228192

DISCLOSURE OF THE INVENTION

Problem to be Solved by the Invention

In view of the foregoing problem, it is an object of the present invention to provide a vehicle electronic control system, a vehicle electronic control unit, and a vehicle control synchronization method whereby synchronization accuracy can be improved in plural electronic control units that execute closely related plural processes.

Means of Solving the Problem

The invention provides a vehicle electronic control system in which a first electronic control unit configured to complete execution of a first control process in a predetermined time is connected to a second electronic control unit configured to execute a second control process inseparable from the first control process. The first electronic control unit transmits a synchronization signal at periods sufficiently less than the predetermined time. The second electronic control unit starts execution of the second control process with reference to the synchronization signal received.

Effect of the Invention

A vehicle electronic control system, a vehicle electronic control unit, and a vehicle control synchronization method can be provided whereby synchronization accuracy in plural electronic control units that execute closely related plural processes can be improved.

BRIEF DESCRIPTION OF THE DRAWINGS

FIG. 1C illustrates an example of a relationship between two processes in which start of execution of one of the processes is too early (related art);

FIG. 2A illustrates an example of a synchronization signal transmitted from an ECU_A to an ECU_B (related art);

FIG. 3 illustrates an example of a synchronization signal for synchronizing plural electronic control units;

FIG. 10A illustrates an example of a synchronization signal for synchronizing plural electronic control units;

FIG. 14B illustrates an example of a time relationship between the process A and the process B; and FIG. 14C illustrates an example of a time relationship among a process A, a process B, and a process C.

Figure 1A:
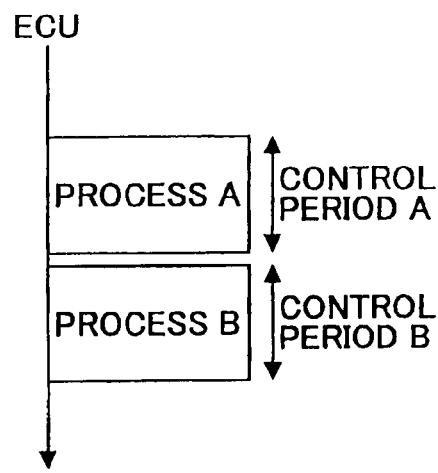
FIG. 1A illustrates an example of synchronization of two processes (related art)
Figure 1B:
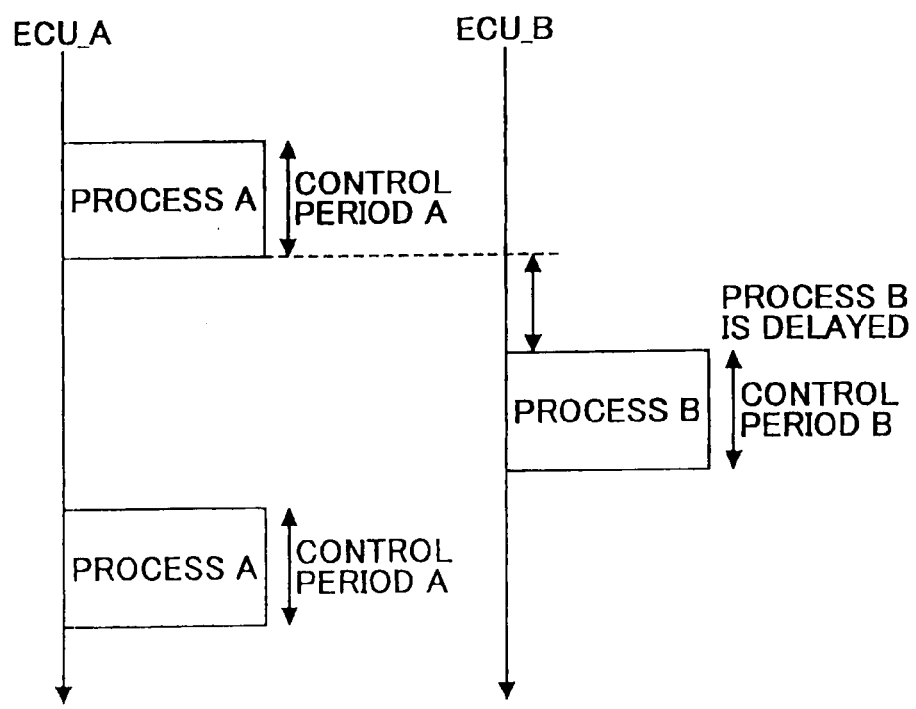
FIG. 1B illustrates an example of a delay in one of the processes (related art)
Figure 2B:
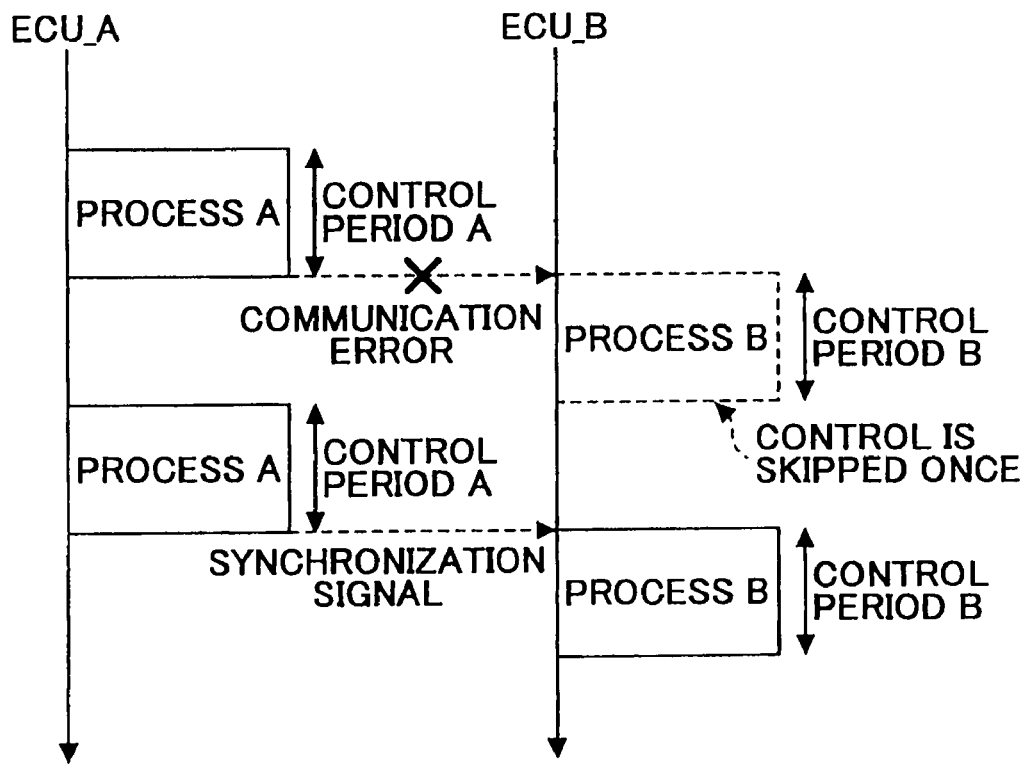
FIG. 2B illustrates the development of communication error in the synchronization signal transmitted from the ECU_A to the ECU_B (related art)

DESCRIPTION OF REFERENCE NUMERALS 11A,11B input/output interface
12A,12B EEPROM
13A,13B CPU
14A,14B CAN communication unit
15A,15B switch element
16A,16B ASIC
17 direct connection line
18 CAN bus
20 synchronization signal program
24 synchronization signal transmit unit
25 synchronization signal receive unit
50 ECU
100 electronic control system

BEST MODE OF CARRYING OUT THE INVENTION

Embodiments of the present invention are described in the following with reference to the attached drawings.

FIG. 3 illustrates an example of a synchronization signal for synchronizing plural electronic control units according to an embodiment. The electronic control units may be referred to as "ECUs". The ECUs may include an ECU_A, an ECU_B, and an ECU_C. Any of the ECUs may be referred to as "the ECU 50".

The ECU_A transmits the synchronization signal to the ECU_B at transmission periods T sufficiently less than a control period A. The ECU_B utilizes a synchronization signal interrupt produced by the reception of the synchronization signal as a start timing for starting a process B. Because the synchronization signal is transmitted at periods sufficiently less than the control period A or the control period B, the ECU_B can start executing the process B by utilizing the synchronization signal received as the start timing even if the ECU_B fails to receive some of the synchronization signals since the start of the process A by the ECU_A. Thus, the ECU_B can start executing the process B without waiting for the elapse of the control period B even if the ECU_B fails to receive some of the synchronization signals since the start of the process A by the ECU_A. In this way, the elapse of the control period B without the ECU_B controlling the process B can be prevented.

The ECU_A may complete a process necessary for the process B substantially in the first half of the control period A. The ECU_B may complete the process B substantially in the latter half of the control period B. Upon completion of the process A, the ECU_A transmits a process result to the ECU_B (or may not transmit, if the process result is not required by the ECU_B). Thus, as illustrated in FIG. 3, the ECU_B can execute the process B by utilizing the result of the process A even if the execution of the process B by the ECU_B is started at a start timing with a slight delay from the start of the process A. This means that, when the processing speeds of the ECU_A and the ECU_B are on the same order as those of the related art, the control period A or B of FIG. 3 is more than the control period of the process A or B according to the related art.

Because the number of the synchronization signals transmitted from the process A that may be missed before the ECU_B receives the synchronization signal corresponding to the start timing can be specified by design, the control periods A and B may be on the same order as those of the related art. Thus, the relationship between the synchronization signal and the start timing can be varied, which is one of the features of the ECU 50 according to the present embodiment.

Embodiment 1

Figure 4:
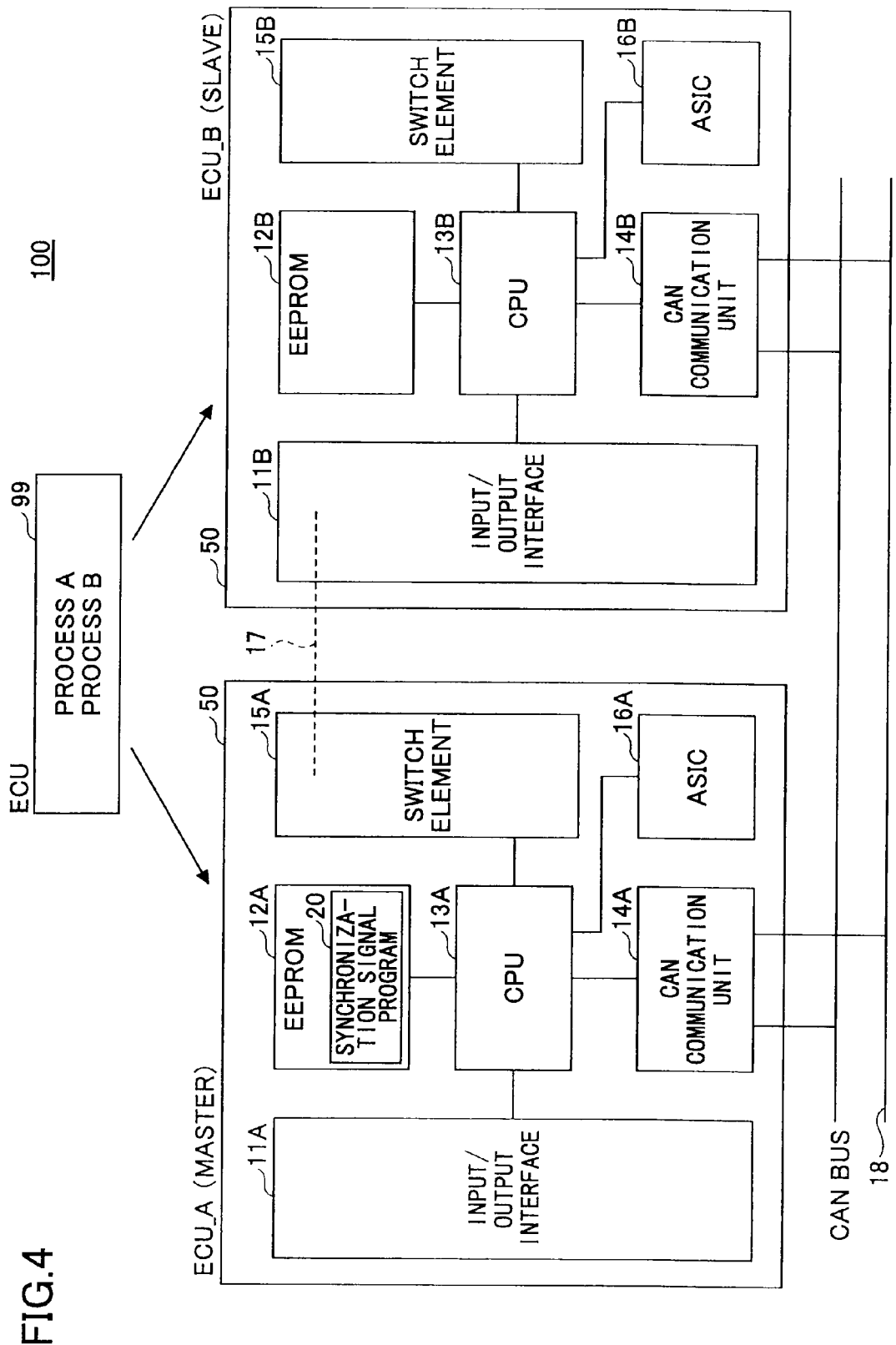
FIG. 4 is an example of a schematic diagram of an electronic control system in which plural electronic control units are connected.

FIG. 4 illustrates an electronic control system 100 in which plural ECUs 50 are connected. The ECU 99 is an ECU that executes the processes A and B by a single unit. The process A is allocated to the ECU_A, and the process B is allocated to the ECU_B. In the example of FIG. 4, the ECU_A and the ECU_B have the same structures. Preferably, the ECU_A and the ECU_B may have different structures. Namely, when functions are separated from the ECU 99 for plural (two in the illustrated example) ECUs, such as the ECU_A and the ECU_B, the processing capacity of hardware can be appropriately designed in view of the processing load of the processes A and B. In FIG. 4, the ECU_A that transmits the synchronization signal is designated as a "master" while the ECU_B that receives the synchronization signal is designated as a "slave". However, this is for convenience's sake; preferably, the ECU_B may transmit the synchronization signal to the ECU_A or another ECU.

In the illustrated example of FIG. 4, the original ECU 99 includes an engine ECU, for example. The engine ECU includes a power supply control function and an engine control function. Because the power supply control function is increasingly being diversified, the functions that used to be executed by the single ECU 99 are divided so that the processing load can be distributed. Specifically, the power supply control function is allocated to the ECU_A while the engine control function is allocated to the ECU_B. The power supply control function may activate a starter motor upon ignition-on in order to increase the engine rotational speed, and turn on a switch between a fuel pump and a battery in order to activate the fuel pump and enable the supply of fuel to the engine. The engine control function may control the timing of fuel injection into the engine with an increased rotational speed so that the engine can idle.

Preferably, the power supply control function may calculate a SOC (State of Charge) of the battery based on a voltage and a current of the battery. When it is determined that the battery is not sufficiently charged based on the SOC, the power supply control function may control an alternator adjusting voltage, while the engine control function may increase the engine rotational speed during idling in order to increase the charging rate. Thus, the power supply control function and the engine control function are closely related to each other.

In recent years, hybrid vehicles and electric vehicles have become commercially available. In such vehicles, an electric motor and the engine may be controlled in a closely related manner, or plural in-wheel motors may be controlled in a closely related manner. In the case of a hybrid vehicle, the ECU 50 may include a hybrid ECU. The hybrid ECU may calculate a required torque to be outputted to an input shaft based on the amount of operation of the accelerator pedal by an operator and the vehicle speed, and then calculate control amounts for the engine and the motor such that the required torque can be obtained (process A). The engine ECU may calculate a rotational speed based on one of the control amounts and control the engine (process B). The motor ECU may calculate a current value of a current that flows through the motor based on the other control amount (torque command), or perform switching of an inverter based on a PWM signal of a duty ratio determined in accordance with the current value (process C).

Thus, in this case, the processes A through C are executed by the three ECUs 50, i.e., the hybrid ECU, the engine ECU, and the motor ECU, in a closely coordinated manner in order to operate the vehicle. The processes A through C can be synchronized among the three ECUs 50 by a synchronization signal in accordance with the present embodiment. In the example of the hybrid vehicle, the functions (processes A through C) are not integrated. Preferably, the processes executed by the three ECUs 50 may be integrated for two ECUs 50. For example, the process A and the process B may be integrated for the ECU_A while the process C may be integrated for the ECU_B, so that the processes can be synchronized between the two ECUs 50 in accordance with the synchronization signal of the present embodiment. Thus, the synchronization signal according to the present embodiment may be applied to the case where ECUs 50 are integrated in addition to the case where the processes of the single ECU 99 are separated for plural ECUs 50.

Further, the engine and the transmission may have closely related processes. Two such processes that used to be executed by a power train ECU according to the related art may be separated for the ECU_A and the ECU_B and synchronized by a synchronization signal according to the embodiment of the present invention.

Thus, in the electronic control system 100 according to the present embodiment, the processes A and B that are closely or inseparably related to each other are executed by separate ECUs 50. By "closely" or "inseparably", it is meant that, for example, the process B is required after the process A and that the timing of starting the execution of the process B is restricted by the time that elapses after a process result of the process A is obtained.

As illustrated in FIG. 4, a CPU 13A of the ECU_A is connected to an input/output interface 11A, an EEPROM 12A, a switch element 15A, an ASIC (Application Specific Integrated Circuit) 16A, and a CAN communication unit 14A via buses. A CPU 13B of the ECU_B is connected to an input/output interface 11B, an EEPROM 12B, a switch element 15B, an ASIC 16B, and a CAN communication unit 14B via buses. Because the ECU_A and the ECU_B may have the same structures, a description is given of the ECU_A in the following.

The EEPROM 12A stores a process A program corresponding to the process A (or the process B in the case of the ECU_B), data for the process A, and a synchronization signal program 20 for transmitting a synchronization signal. The ECU_A may also store a program (not illustrated) other than the process A program because the ECU_A may perform a process which is not closely related to the process B. The process A program and the synchronization signal program 20 may be separately provided. Preferably, the process A may be executed by a single main function, wherein the synchronization signal program 20 may be provided in the main function.

The input/output interface 11A is connected to various sensors. When the ECU 50 is an engine ECU, the sensors may include an O2 sensor, a water-temperature sensor, and a crank position sensor. The switch element 15A may include a MOSFET or an IGBT (Insulated Gate Bipolar Transistor) as an actual entity. Various switches, actuators, or solenoids may be connected to the switch element 15A. The ASIC 16A may be connected to motors and actuators implemented in accordance with specific operation or control requirements. The CAN communication unit 14A of the ECU_A is connected to the CAN communication unit 14B of the ECU_B via a CAN bus 18, so the plural ECUs 50 can communicate with each other by a time-division multiplex technology. The communications between the ECUs 50 may be realized by using a communication method other than the CAN, such as FlexRay. Preferably, the ECU_A and the ECU_B may be connected to each other via a direct connecting line 17. The relationship between the CAN communication units 14A and 14B and the direct connecting line 17 is described later.

Figure 5:
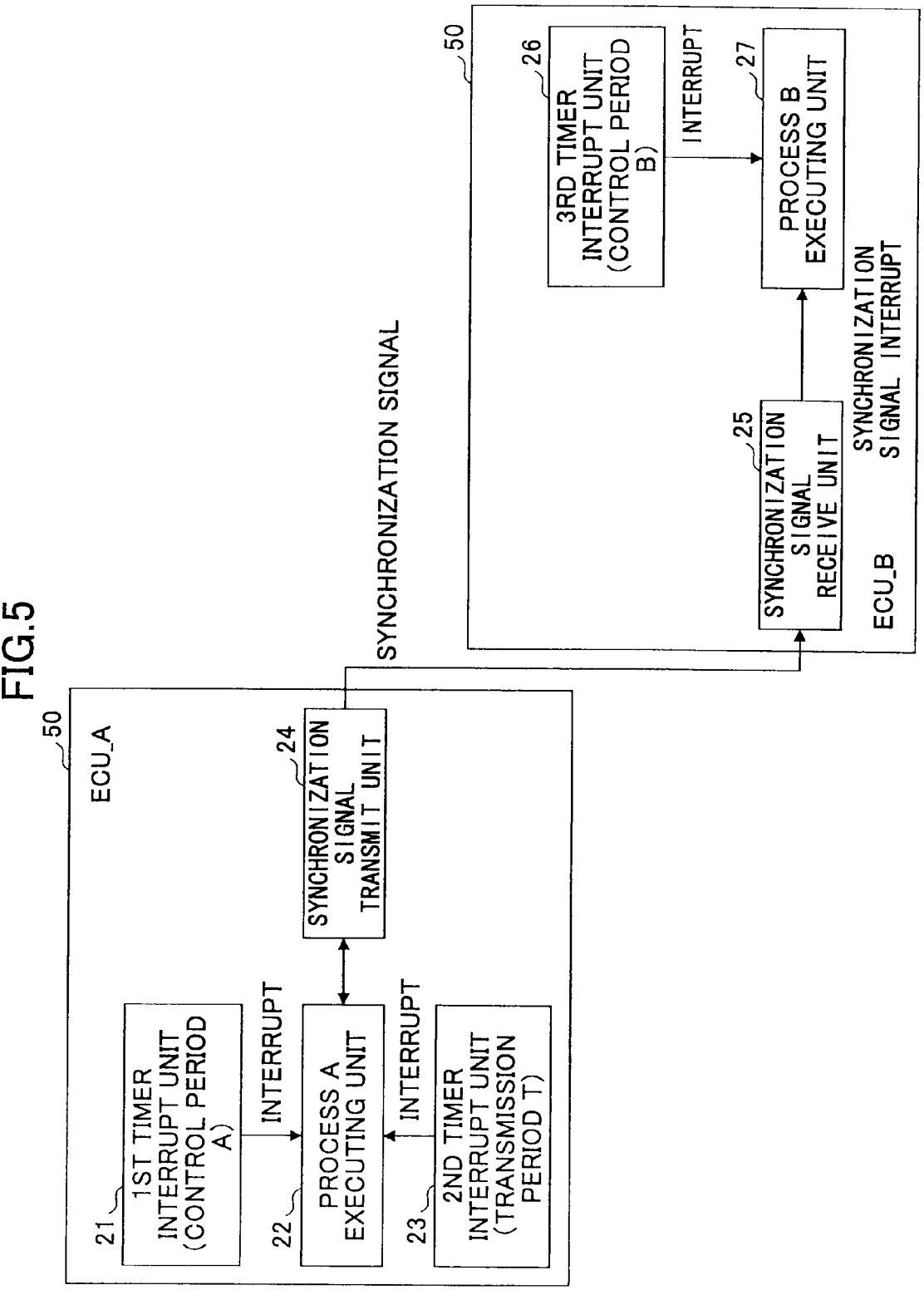
FIG. 5 is an example of a functional block diagram of the ECU_A and the ECU_B.

FIG. 5 illustrates a functional block diagram of the ECU_A and the ECU_B according to the present embodiment. The CPU 13A may include one or plural CPU cores and execute the process A program and the synchronization signal program 20 stored in the EEPROM 12A. A process A executing unit 22, a first timer interrupt unit 21, a second timer interrupt unit 23, and a synchronization signal transmit unit 24 may be realized by a logic circuit such as the ASIC 16A, or when the process A program and the synchronization signal program 20 are executed by the CPU 13A of the ECU_A. Similarly, a process B executing unit 27, a synchronization signal receive unit 25, and a third timer interrupt unit 26 may be realized by a logic circuit such as the ASIC 16B, or when the process B program is executed by the CPU 13B of the ECU_B.

Execution of Process A

The process A executing unit 22 executes the process A. The time in which the CPU 13A executes the process A is substantially constant, so that the execution of the process A can be completed by allocating a time slice longer than the time. The allocated time corresponds to the control period A. The process A may be started when the CPU 13A detects an interrupt, or at a predetermined timing (such as upon completion of the process B).

When the control period A elapses, the first timer interrupt unit 21 issues a timer interrupt to the CPU 13A. The first timer interrupt unit 21 may reset a first timer immediately before the execution of the process A, set the control period A in the first timer, and then start the first timer. After the start of the first timer (or actually after the start of a second timer) as described below, the process A executing unit 22 starts the execution of the process A. When the first timer counts the elapse of the control period A and issues an interrupt to the CPU 13A, the CPU 13A executes a process other than the process A.

Transmission of Synchronization Signal

The synchronization signal may be transmitted in several modes. For example, when the CPU 13A includes plural cores, the synchronization signal may be transmitted by executing the synchronization signal program 20 with a core other than the core that executes the process A. Preferably, the synchronization signal may be transmitted by the ASIC 16A. In this case, the synchronization signal transmit unit 24 may be implemented by hardware. While in these modes the synchronization signal may be transmitted without affecting the process A, a cost increased may result.

Preferably, the process A program and the synchronization signal program may be implemented by a single program, and the process A executing unit 22 may execute a synchronization signal program for transmitting the synchronization signal periodically. In this case, the synchronization signal transmit unit 24 may be implemented as a lower-level function called from a main function or a subroutine. However, when a transmission period T of the synchronization signal is short, the accuracy of the transmission period T may not be guaranteed.

Preferably, a timer interrupt may be utilized, as illustrated in the functional block diagram of FIG. 5. In the illustrated mode, the synchronization signal transmit unit 24 is realized at transmission periods, and completed when the synchronization signal is transmitted.

First, the second timer interrupt unit 23 resets the second timer immediately after the first timer is started by the first timer interrupt unit 21, sets the transmission period T in the second timer, and then starts the second timer. After the start of the second timer, the process A executing unit 22 executes the process A. When the second timer counts the elapse of the transmission period T and issues an interrupt to the CPU 13A, an interrupt handler withdraws the context of the process A and causes the CPU 13A to execute the synchronization signal program 20. As a result, the synchronization signal transmit unit 24 is realized, and the synchronization signal transmit unit 24 transmits the synchronization signal.

When the transmission of the synchronization signal by the synchronization signal transmit unit 24 is completed, the context withdrawn by the interrupt handler may be set in the CPU 13A so that the process A program can be executed. By repeating the process of withdrawing the process A, transmitting the synchronization signal, and resuming the process A, the ECU_A can transmit the synchronization signal at the transmission periods T.

Synchronization Signal

The synchronization signal is transmitted via the CAN communications or the direct connecting line 17. The direct connecting line 17 may include wire harnessing connecting a terminal of the ECU_A (such as the switch element 15A in FIG. 4) and a terminal of the ECU_B (such as the input/output interface 11B in FIG. 4). The direct connecting line 17 may be less likely to cause transmission error, such as the synchronization signal failing to reach the ECU_B, because the direct connecting line 17 is used only by the ECU_A and the ECU_B. However, the need for installing the direct connecting line 17 on a vehicle may result in an increase in cost or weight of the vehicle.

On the other hand, such cost increases may be prevented by transmitting the synchronization signal via the CAN communications because the ECUs 50 include the corresponding CAN communication units 14A and 14B. However, because the CAN communications are based on the CSMA/CA (Carrier Sense Multiple Access/Collision Avoidance) accessing procedure, the ECU_A may not be able to transmit the synchronization signal at a desired timing if the CAN bus 18 is being used by another ECU 50 including the ECU_B.

Thus, when it may be estimated that the utilization rate of the CAN bus 18 to which the ECU_A and the ECU_B are connected is sufficiently low, the system may be designed such that the synchronization signal is transmitted by the CAN communications without implementing the direct connecting line 17. When the utilization rate of the CAN bus 18 is relatively high, the system may be designed such that the synchronization signal is transmitted by implementing the direct connecting line 17. Thus, various implementations may be adopted in different vehicles or depending on the design policy.

The synchronization signal transmitted by the direct connecting line 17 may include a High (such as 5 V) signal. The synchronization signal transmit unit 24 may transmit the High signal by turning on one of the switches connected to the switch element 15A. The input/output interface 11B of the ECU_B detects a rising edge from Low to High and the synchronization signal receive unit 25 receives the detection result as the synchronization signal.

The synchronization signal may be transmitted by the CAN communications using the following CAN frame as a unit of transmission.

[SOF; data ID field; RTR; DLC; data field; CRC field; ACK field; EOF]

In the data ID field, a data ID identifying communication data is stored. In the data ID, a value indicating the storage of the synchronization signal is set. A data field may normally store transmission target data. In accordance with the present embodiment, however, no data need be stored in the data field as long as the ECU_A can notify the ECU_B of the synchronization timing. When the ECU_A transmits plural different synchronization signals, synchronization signal identifying data may be stored in the data field. Because the CAN frame for transmitting the synchronization signal has fixed values in the respective fields, the CAN frame may be stored in the synchronization signal program 20A as fixed data.

The CAN communication unit 14B of the ECU_B refers to the data ID of the CAN frame that is broadcast via the CAN bus 18, and receives the CAN frame if the data ID indicates that the ECU_B should receive the CAN frame. The synchronization signal receive unit 24 receives the synchronization signal by utilizing a reception interrupt of the CAN communication unit 14B.

Transmission Period T

The transmission period T is described. The transmission period T may correspond to a time sufficiently less than the control period A. Preferably, the transmission period T may be on the order of 1/10 of the control period A, such as in a range of 1/3 to 1/100 of the control period A.

The shorter the transmission period T, the more easily the start timing of starting the execution of the process B can be made to coincide with the start timing of the process A. While the load of the direct connection line 17 may not be considered when the synchronization signal is transmitted by using the direct connection line 17, the process load of the CPU 13A due to the synchronization signal transmit unit 24 increases as the transmission period T becomes shorter. Thus, the transmission period T may be designed appropriately such that execution of the process A is not affected.

When the synchronization signal is transmitted by using the CAN communications, the bus load of the CAN bus 18 increases as the transmission period T becomes shorter. Thus, an appropriate transmission period T is determined such that unnecessary collision of CAN frames can be prevented. In this way, an upper-limit (shortest) transmission period T can be determined.

On the other hand, the lower-limit of the transmission period T is limited by the actual execution time of the process A. As mentioned above, when the process A is completed in a time of about one half the control period A, the transmission period T may need to be at least less than ½ of the control period A.

Execution of Process B

Execution of the process B is started at a start timing corresponding to the reception of the synchronization signal. The synchronization signal receive unit 25 receives the synchronization signal upon detection of a rising edge by a predetermined circuit via the direct connection line 17 (I/O interrupt). The synchronization signal receive unit 25 then issues an interrupt to the CPU 13A so that the execution of the process B can be started by the ECU_B.

When the ECU_B receives the synchronization signal via the CAN communications, the synchronization signal receive unit 25 issues an interrupt to the CPU 13B upon reception of a CAN frame of the synchronization signal by the CAN communication unit 14B (reception interrupt). Thus, the CPU 13B starts execution of the process B. In the following, the I/O interrupt and the reception interrupt are both simply referred to as a "synchronization signal interrupt".

In response to the synchronization signal interrupt sent to the CPU 13B, the interrupt handler withdraws the context of the current process being executed by the CPU 13B, and causes the CPU 13B to execute the process B program. As a result, the process B executing unit 27 is realized, and the process B executing unit 27 executes the process B. The time of execution of the process B by the CPU 13B is substantially constant. Thus, the execution of the process B can be completed by allocating a time slice longer than the execution time. The allocated time corresponds to the control period B.

The third timer interrupt unit 26 issues a timer interrupt to the CPU 13B when the control period B elapses. The third timer interrupt unit 26 may reset a third timer immediately before the execution of the process B, set the control period B in the third timer, and then start the third timer. Thus, the process B executing unit 27 starts execution of the process B after the start of the third timer. When the third timer counts the elapse of the control period B and issues an interrupt to the CPU 13B, the CPU 13B transitions to a process other than the process B. While the control period A and the control period B are approximately the same in the example of FIG. 3, the control period A and the control period B may be independent from each other as described above.

Operating Procedure of Electronic Control System (ECU_A and ECU_B) 100

Figure 6:
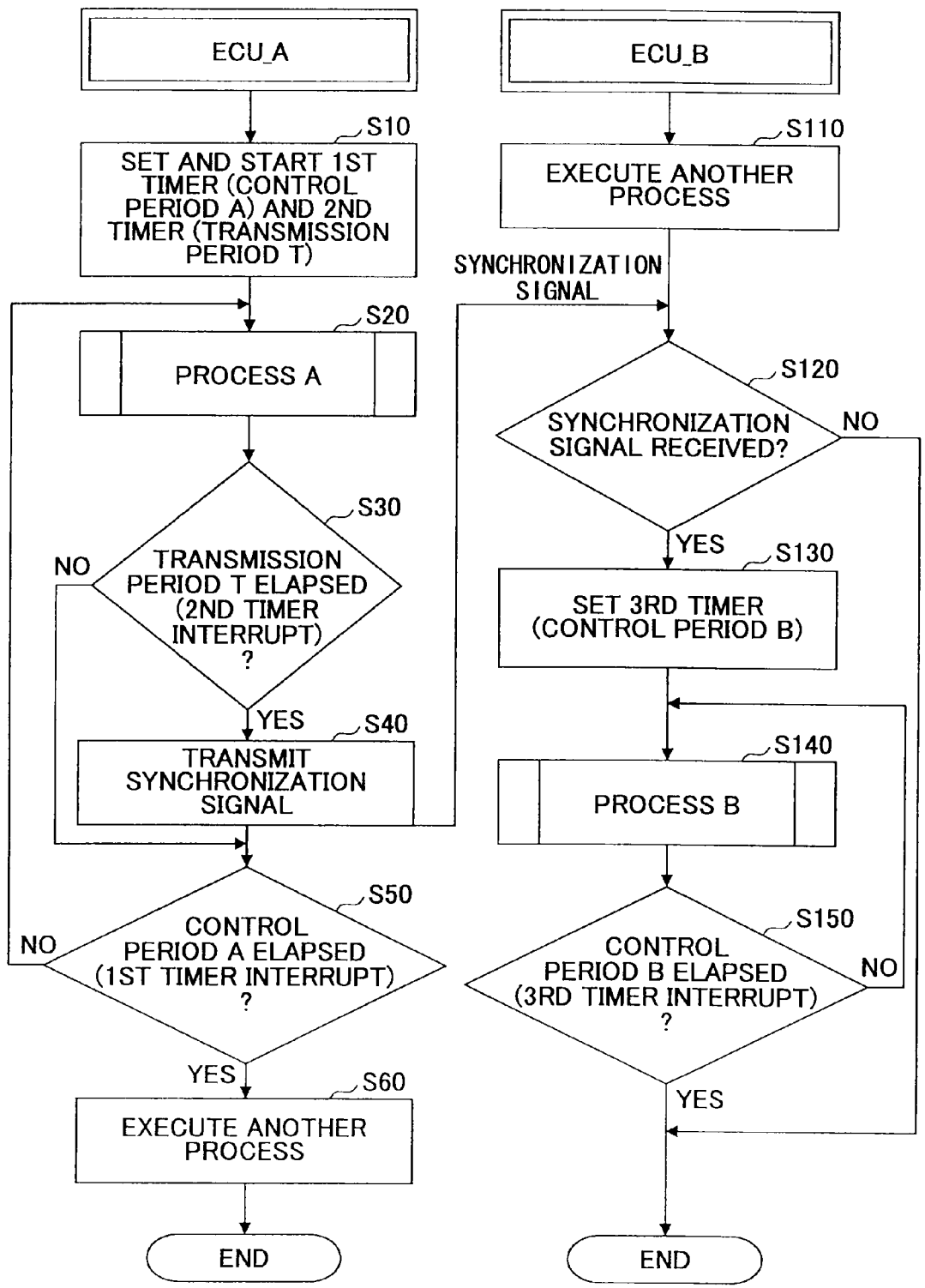
FIG. 6 is an example of a flowchart illustrating a characteristic portion of an operating procedure of the electronic control unit system.

FIG. 6 is a flowchart of a characteristic portion of an operating procedure of the electronic control unit system. While the ECU_A and the ECU_B execute their own processes, the operation of the flowchart of FIG. 6 may be started when the ECU_A starts the process A because the process A and the process B are closely related to each other in terms of control.

When the CPU 13A executes the process A program and the synchronization signal program, the first timer interrupt unit 21 sets the first timer (control period A) and starts the first timer, while the second timer interrupt unit 23 sets the second timer (transmission period T) and starts the second timer (S10).

Then, the process A executing unit 22 starts execution of the process A (S20). The process A executing unit 22 executes the process A until the second timer issues an interrupt to the CPU 13A (S30).

When the transmission period T elapses and the second timer issues an interrupt to the CPU 13A ("Yes" in S30), the synchronization signal transmit unit 24 transmits the synchronization signal to the ECU_B (S40). When the synchronization signal is transmitted, the process A executing unit 22 resumes executing the process A.

During the execution of the process A, the procedure is returned to step S20 and the execution of the process A by the process A executing unit 22 is continued until the first timer issues an interrupt to the CPU 13A ("No" in S50)(S20).

When the control period A elapses and the first timer issues an interrupt to the CPU 13A ("Yes" in S50), the ECU_A may start a process other than the process A (S60).

Referring to the process of the ECU_B, the ECU_B executes a process other than the process B until reception of the synchronization signal (S110).

When the synchronization signal is transmitted from the ECU_A ("Yes" in S120), the synchronization signal receive unit 25 issues an interrupt to the CPU 13B and the CPU 13B executes the process B program. When the execution of the process B is started, the third timer interrupt unit 26 is implemented. The third timer interrupt unit 26 sets a third timer (control period B) and starts the third timer (S130).

The process B executing unit 27 starts execution of the process B (S140). The process B executing unit 27 executes the process B of step S140 until the third timer issues an interrupt to the CPU 13B, i.e., until the control period B elapses ("No" in S150)(S140). Thus, the ECU_A and the ECU_B repeat the procedure of FIG. 6 when the execution of the process A is started by the ECU_A.

Thus, in the electronic control system 100 according to the present embodiment, the synchronization signal is transmitted to the ECU_B at periods sufficiently less than the control period A of the ECU_A. Thus, even if the ECU_B fails to receive several synchronization signals since the start of the process A by the ECU_A, the ECU_B can start execution of the process B upon reception of a subsequently received synchronization signal as a start timing. Thus, the ECU_B can execute the process B while minimizing the delay with respect to the closely related process A. In this way, the problem according to the related art of failing to execute the process B during one control period B can be prevented.

Embodiment 2

In accordance with the present embodiment, a description is given of the electronic control system 100 in which the ECU_A can transmit the synchronization signal to the ECU_B by using both the direct connection line 17 and the CAN communications.

Figure 7:
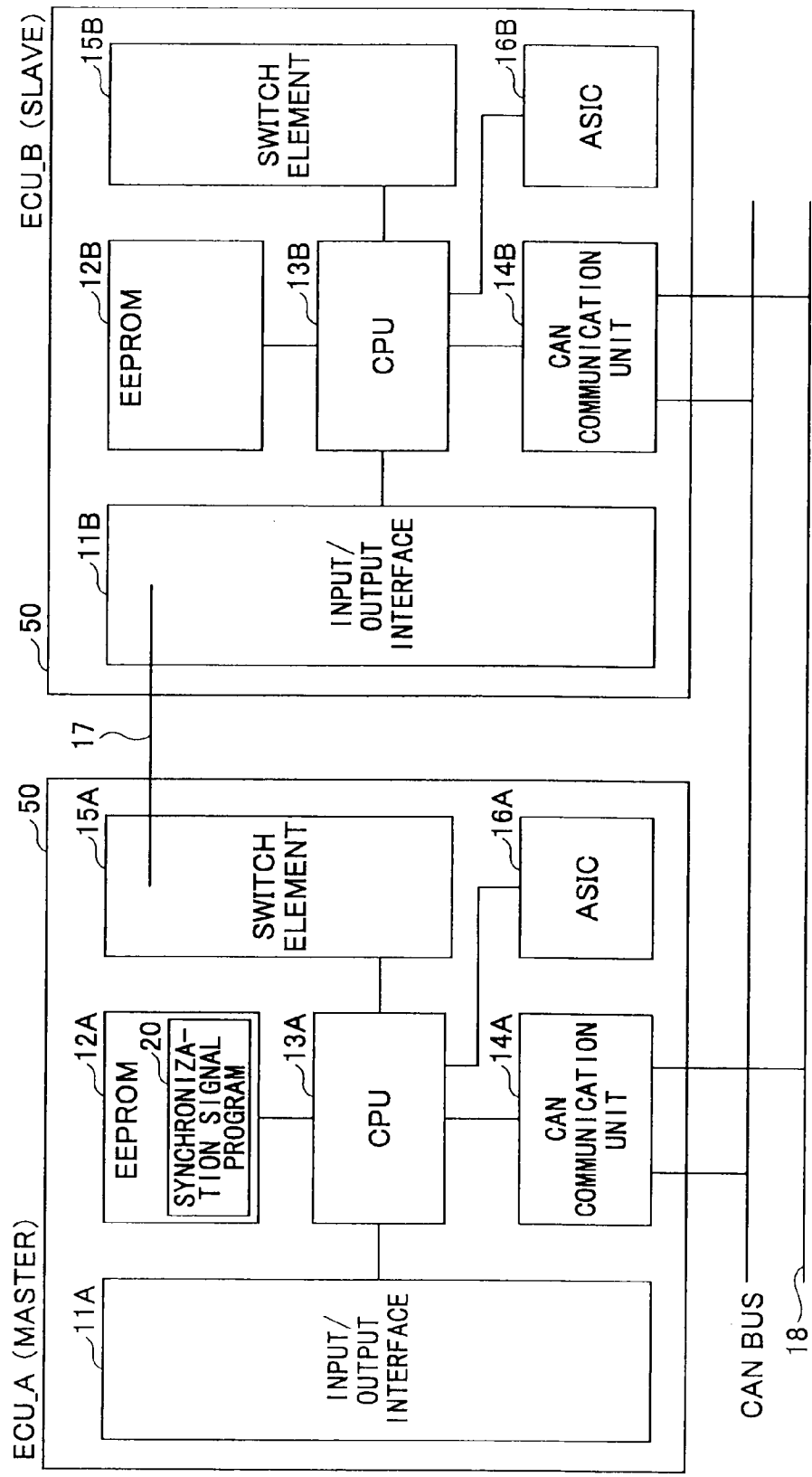
FIG. 7 is an example of a schematic diagram of an electronic control system in which plural electronic control units are connected (Embodiment 2)

FIG. 7 is a diagram of the electronic control system 100 in which plural electronic control units are connected. In FIG. 7, portions similar to those of FIG. 4 are designated with similar reference numerals and their description is omitted. In the electronic control system 100 of FIG. 7, the ECU_A and the ECU_B can perform CAN communications with each other. The electronic control system 100 also includes the direct connection line 17. Thus, even if communication via one of the direct connection line 17 and the CAN communication units 14A and 14B is made difficult, the ECU_B can receive the synchronization signal via the other.

Several modes of transmission of the synchronization signal by the synchronization signal transmit unit 24 are described.

(1) In a first mode, the synchronization signal transmit unit 24 transmits the synchronization signal via both the direct connection line 17 and the CAN communications. In this case, the synchronization signal can reach the ECU_B almost without fail. However, the bus load of the CAN bus 18 may increase. The synchronization signal transmit unit 24 may transmit a High signal via the direct connection line 17 and a CAN frame via the CAN communication unit 14A at the same time. However, the synchronization signal receive unit 25 may more often than not fail to receive the synchronization signal via the direct connection line 17 and the CAN communication unit 14B simultaneously. Thus, the synchronization signal receive unit 25 may start the process B upon reception of the synchronization signal that is received earlier.

(2) In a second mode, when abnormality is caused in one of the direct connection line 17 and the CAN communication units 14A and 14B, the synchronization signal transmit unit 24 transmits the synchronization signal via the other of the direct connection line 17 and the CAN communication units 14A and 14B. For example, when abnormality is caused in the direct connection line 17, the synchronization signal may be transmitted via the CAN communications. When abnormality is caused in the CAN communications, the synchronization signal may be transmitted via the direct connection line 17. Thus, a fail-safe operation can be performed. However, in this case, the method of transmission is selected by the ECU_A by detecting abnormality in the ECU_B, so that it may be necessary for the ECU_A to share information about the abnormality in the ECU_B. While the ECU_B may receive the synchronization signal via the direct connection line 17 or the CAN communications, it may be preferable for the ECU_B to share information about abnormality caused in the ECU_A.

Figure 8:
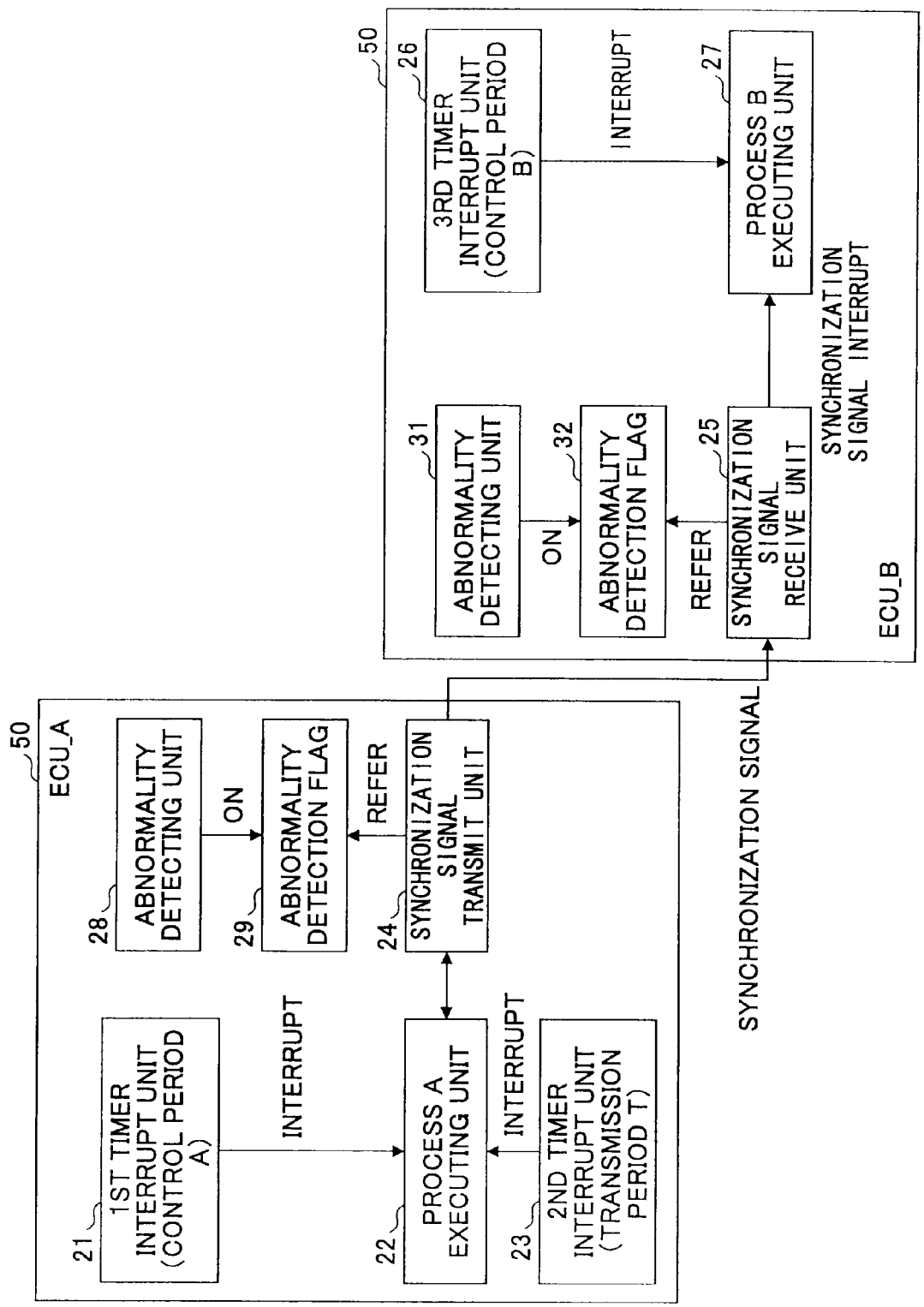
FIG. 8 is an example of a functional block diagram of the ECU_A and the ECU_B (Embodiment 2)

FIG. 8 is a functional block diagram of mode (2) according to the present embodiment. A functional block diagram for mode (1) has been omitted because the functional block diagram of FIG. 8 also applies to mode (1), although the synchronization signal transmit unit 24 transmits the High signal via the direct connection line 17 and the CAN frame via the CAN communication unit 14A in mode (1). According to the present embodiment, the ECU_A includes an abnormality detecting unit 28 and the ECU_B includes an abnormality detecting unit 31. The ECU_A and the ECU_B are connected to each other via the direct connection line 17. Thus, when no abnormality is detected in the direct connection line 17, the synchronization signal transmit unit 24 may transmit the synchronization signal via the direct connection line 17, thus reducing the bus load.

Suppose that the abnormality detecting unit 28 and the abnormality detecting unit 31 have detected abnormality in the direct connection line 17, such as a voltage lower or higher than a predetermined value at a terminal to which the direct connection line 17 is connected. In this case, at least one of the abnormality detecting unit 28 of the ECU_A and the abnormality detecting unit 31 of the ECU_B detects the presence of abnormality in the direct connection line 17. The abnormality detecting unit 31 of the ECU_B may detect abnormality in the absence of reception of the synchronization signal from the ECU_A for a predetermined period of time via the direct connection line 17.

The one abnormality detecting unit 28 (or 31) that has detected abnormality reports abnormality to the other abnormality detecting unit 31 (or 28) by using a CAN frame, for example. Thus, the abnormality detecting unit 28 of the ECU_A and the abnormality detecting unit 31 of the ECU_B can share information about the detection of abnormality. The abnormality detecting unit 28 may record abnormality in the direct connection line 17 by operating an abnormality detection flag (which may be "off" when there is no abnormality or "on" when there is abnormality) 29 indicating the presence or absence of detection of abnormality. Similarly, the abnormality detecting unit 31 may record abnormality in the direct connection line 17 by operating an abnormality detection flag 32.

The synchronization signal transmit unit 24 refers to the abnormality detection flag 29. When the abnormality detection flag 29 is off, the synchronization signal transmit unit 24 transmits the synchronization signal via the direct connection line 17. When the abnormality detection flag 29 is on, the synchronization signal transmit unit 24 transmits the synchronization signal via the CAN communication unit 14A. Further, the synchronization signal receive unit 25, by referring to the abnormality detection flag 32, receives the synchronization signal via the direct connection line 17 when the abnormality detection flag 32 is off, or via the CAN communication unit 14B when the abnormality detection flag 32 is on.

In this way, the bus load can be reduced when there is no abnormality in the direct connection line 17. When there is abnormality in the direct connection line 17, the synchronization signal can be transmitted via the CAN communications.

Figure 9:
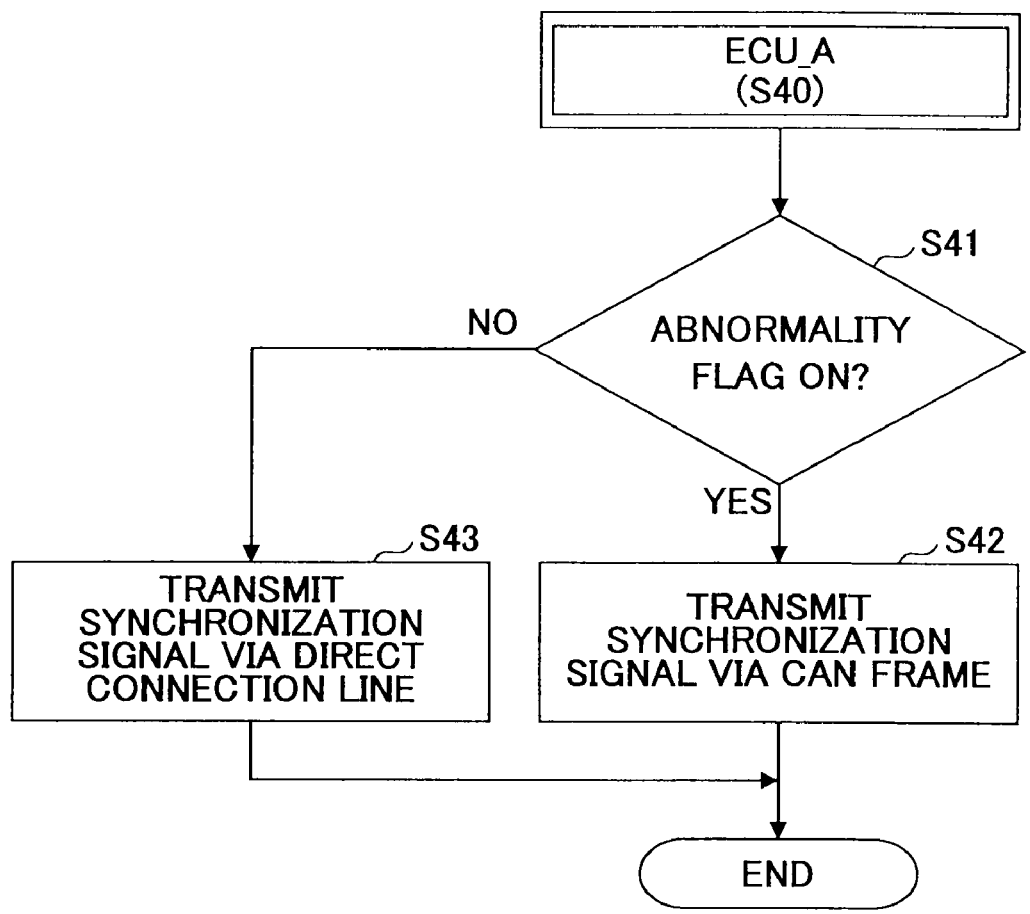
FIG. 9 is an example of a flowchart of a procedure in step S40 of FIG. 6.

FIG. 9 is a flowchart of a procedure in step S40 of FIG. 6. The operating procedure of the electronic control system 100 is the same as that of FIG. 6 and is therefore omitted. The abnormality detecting units 28 and 31 have already turned on the abnormality detection flags 29 and 32 upon detection of abnormality regardless of the procedure of FIG. 6.

When the transmission period T elapses and the second timer issues an interrupt to the CPU 13A ("Yes" in S30), the synchronization signal transmit unit 24 transmits the synchronization signal to the ECU_B (S40). At this time, the synchronization signal transmit unit 24 determines whether the abnormality detection flag 29 is on with reference to the abnormality detection flag 29 (S41).

When the abnormality detection flag 29 is on ("Yes" in S41), the synchronization signal transmit unit 24 transmits the synchronization signal by using the CAN frame (S42). When the abnormality detection flag 29 is off ("No" in S41), the synchronization signal transmit unit 24 transmits the synchronization signal via the direct connection line 17 (S43). The subsequent procedure is the same as that described in FIG. 6.

Thus, the electronic control system 100 according to the present embodiment provides the following effect in addition to the effects provided by Embodiment 1. Namely, the synchronization signal can be transmitted both via the CAN communications and the direct connection line 17, so that the synchronization signal can be transmitted to the ECU_B more reliably.

Embodiment 3

In accordance with the present embodiment, the electronic control system 100 is described in which even when the status in which the ECU_B cannot receive the synchronization signal continues, the delay in starting the execution of the process B can be prevented.

FIG. 10A illustrates an example of the synchronization signal for synchronizing plural electronic control units. As described above, the ECU_A transmits the synchronization signal to the ECU_B at the transmission periods T sufficiently less than the control period A.

However, a case may arise in which some of the synchronization signals cannot be received due to noise in the direct connection line 17 or communication error in the CAN communications. Further, because various interrupts may be issued to the ECU_B, the ECU_B may not be able to receive the synchronization signal if the arrival of the synchronization signal coincides with the issuance of an I/O interrupt other than on the direct connection line 17. If such reception failures occur successively (such as twice in the illustrated example), the process B may be delayed. However, such a delay is not preferable because the process A and the process B are closely related to each other.

Figure 10B:
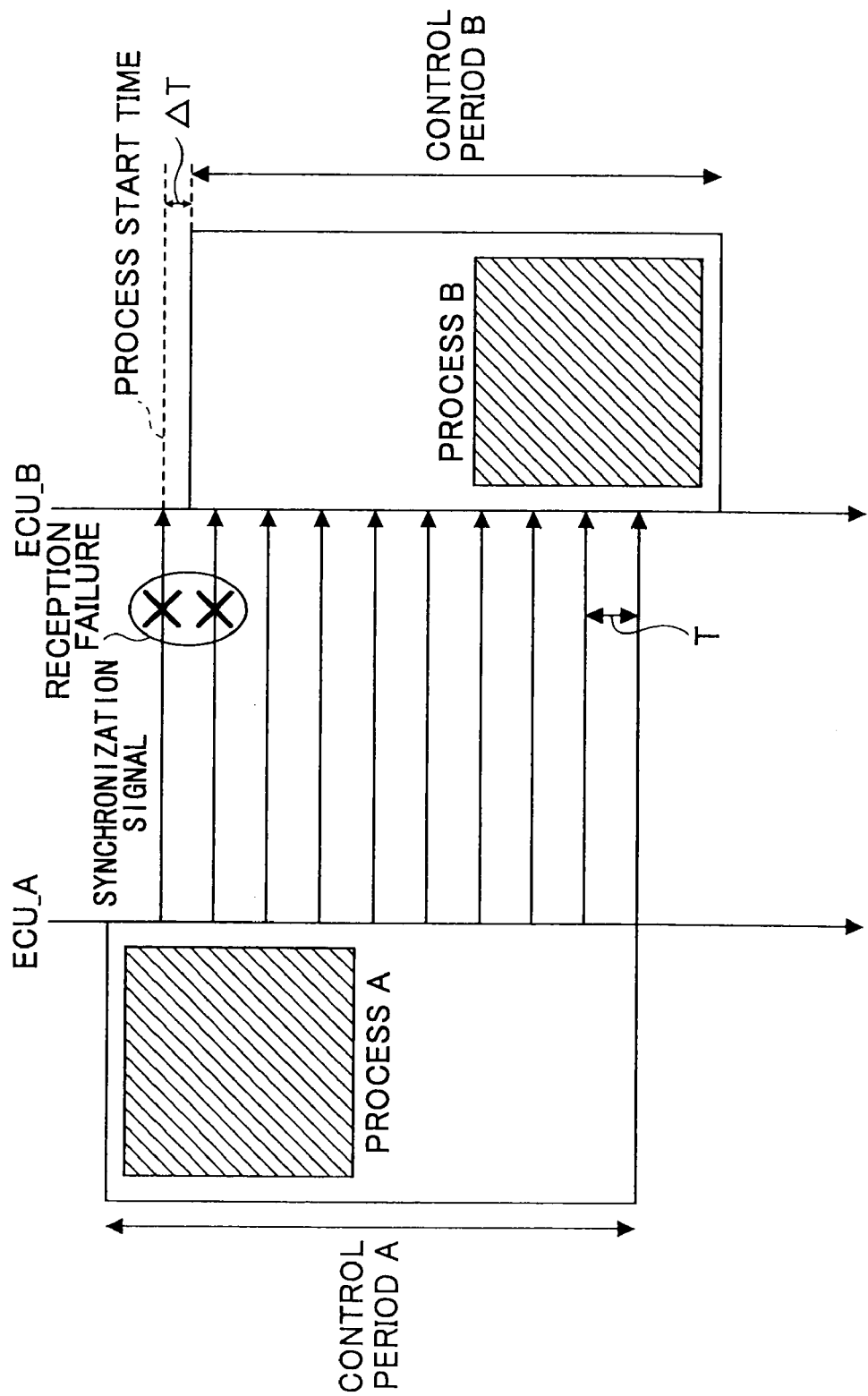
FIG. 10B illustrates an example of a process start time and ΔT.

Thus, as illustrated in FIG. 10B, the ECU_B sets a process start time for the process B. When a time $\Delta T$ or more elapses from the process start time, execution of the process B is started even when the synchronization signal is not received. Thus, the delay in starting the execution of the process B can be limited to $\Delta T$ at the maximum.

Figure 11:
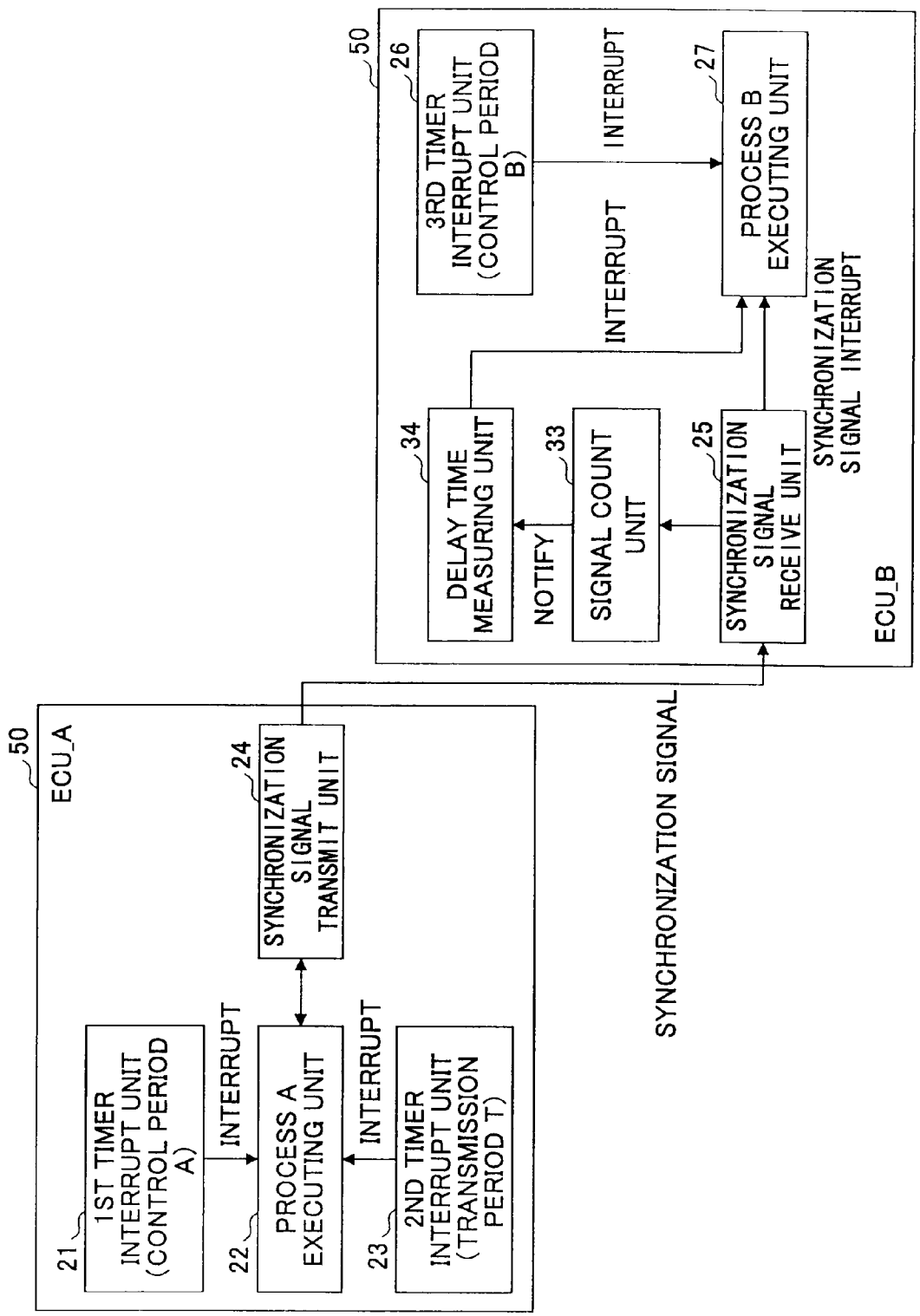
FIG. 11 is an example of a functional block diagram of the ECU_A and the ECU_B (Embodiment 3)

FIG. 11 is an example of a functional block diagram of the ECU_A and the ECU_B according to the present embodiment. In FIG. 11, portions similar to those of FIG. 5 are designated with similar reference numerals and their description is omitted. Preferably, the example may include the abnormality detecting unit 28 and the like as in Embodiment 2.

According to the present embodiment, the ECU_B includes a signal count unit 33 and a delay time measuring unit 34. The signal count unit 33 counts the number of times of reception of the synchronization signal and detects the timing (time) of completion of execution of the process A. The delay time measuring unit 34 measures the time from completion of execution of the process A and issues an interrupt to the CPU 13B when the measured time elapses from the process start time of FIG. 10 by $\Delta T$ or more. Thus, the ECU_B can start execution of the process B even in the absence of reception of the synchronization signal.

The interrupt may include a hardware interrupt when the delay time measuring unit 34 is implemented by hardware such as a counter circuit, or a software interrupt when the delay time measuring unit 34 is implemented by software, such as a system call. In the latter case, the delay time measuring unit 34 may be realized by the CPU 13B executing a program prior to the start of execution of the process B.

The process start time and $\Delta T$ are described with reference to FIG. 12. The process start time is the time at which the ECU_B receives the synchronization signal (hereafter referred to as "the initial synchronization signal") transmitted from the synchronization signal transmit unit 24 immediately after the start of execution of the process A by the ECU_A. It is assumed that the ECU_B fails to receive the initial synchronization signal due to reception failure. In this case, the process start time is set by measuring time from the time at which the synchronization signal has last been received (i.e., the time of completion of the process A).

Figure 12:
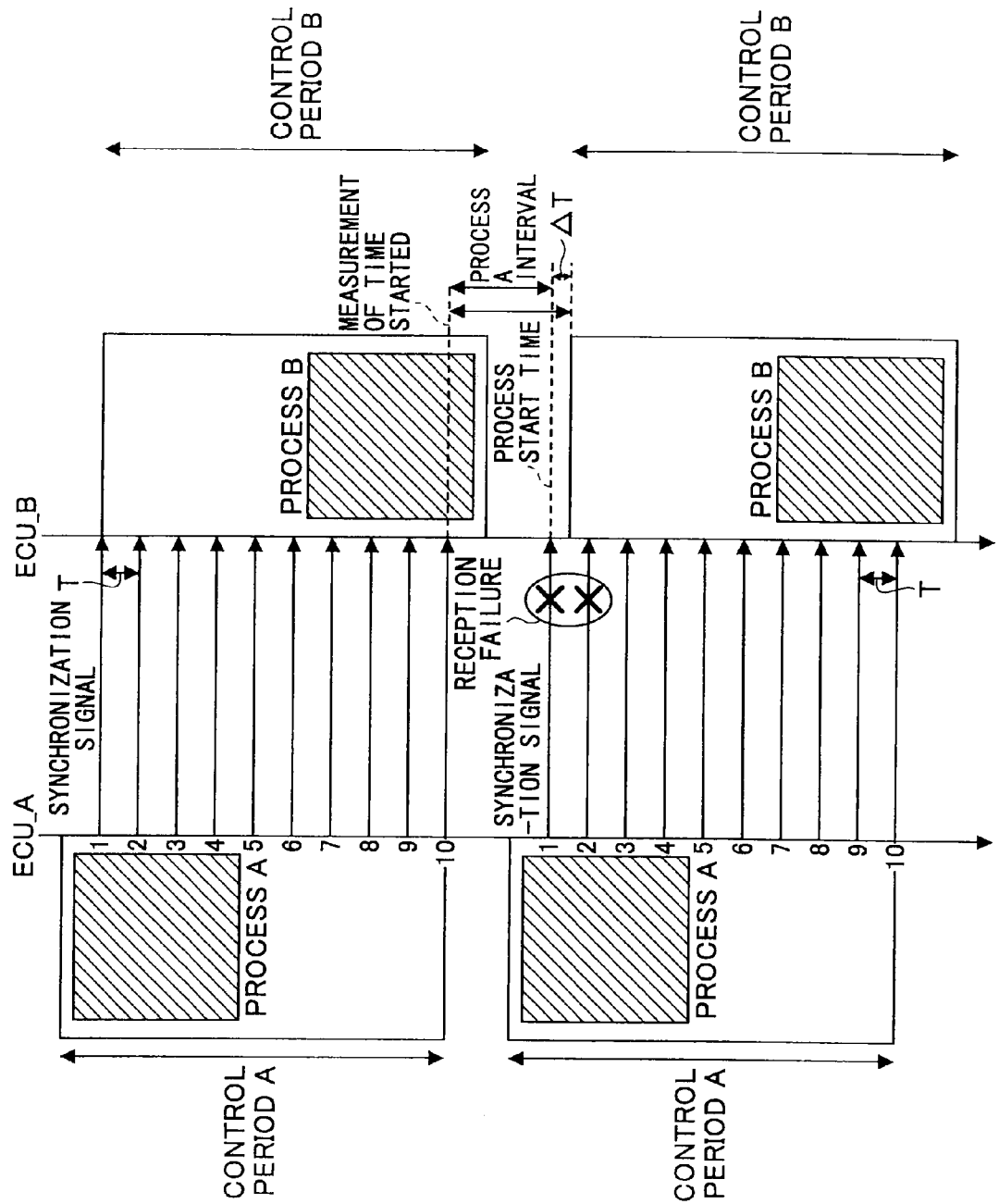
FIG. 12 illustrates an example of a process start time and ΔT.

The number of times the synchronization signal transmit unit 24 transmits the synchronization signal during the control period A of the process A may be fixed to N (which is 10 in the illustrated example of FIG. 12). Thus, the signal count unit 33 counts the number of times the synchronization signal receive unit 25 has received the synchronization signal. Upon reception of the Nth synchronization signal, the signal count unit 33 reports completion of the process A to the delay time measuring unit 34. The delay time measuring unit 34 then starts measuring the measured time upon reception of the report. Even when the synchronization signal is not received, the signal count unit 33 can virtually count the number of times of reception of the synchronization signal by assuming reception failure based on the elapse of the transmission period T, as long as the process start time is clarified even once.

As illustrated in FIG. 12, because the process A is executed at the same process A intervals, the process A interval between the end of one process A and the start of execution of the next process A is substantially constant. The delay time measuring unit 34 sets the time at which the measured time coincides with the process A interval as the process start time. When the measured time exceeds the process start time by $\Delta T$ or more, the delay time measuring unit 34 issues an interrupt to the CPU 13B. In this way, the maximum delay time can be limited to $\Delta T$ even when reception failure occurs in the initial synchronization signal.

$\Delta T$ is described. $\Delta T$ is determined by how much time constraint is involved in the execution of the process B. For example, when the start of execution of the process B does not permit even a delay of time corresponding to the transmission period T of the synchronization signal, $\Delta T$ is determined to be less than the transmission period T. When the reception failure is permitted to occur twice from the initial synchronization signal, $\Delta T$ may be determined to be less than 3× transmission period T.

Figure 13:
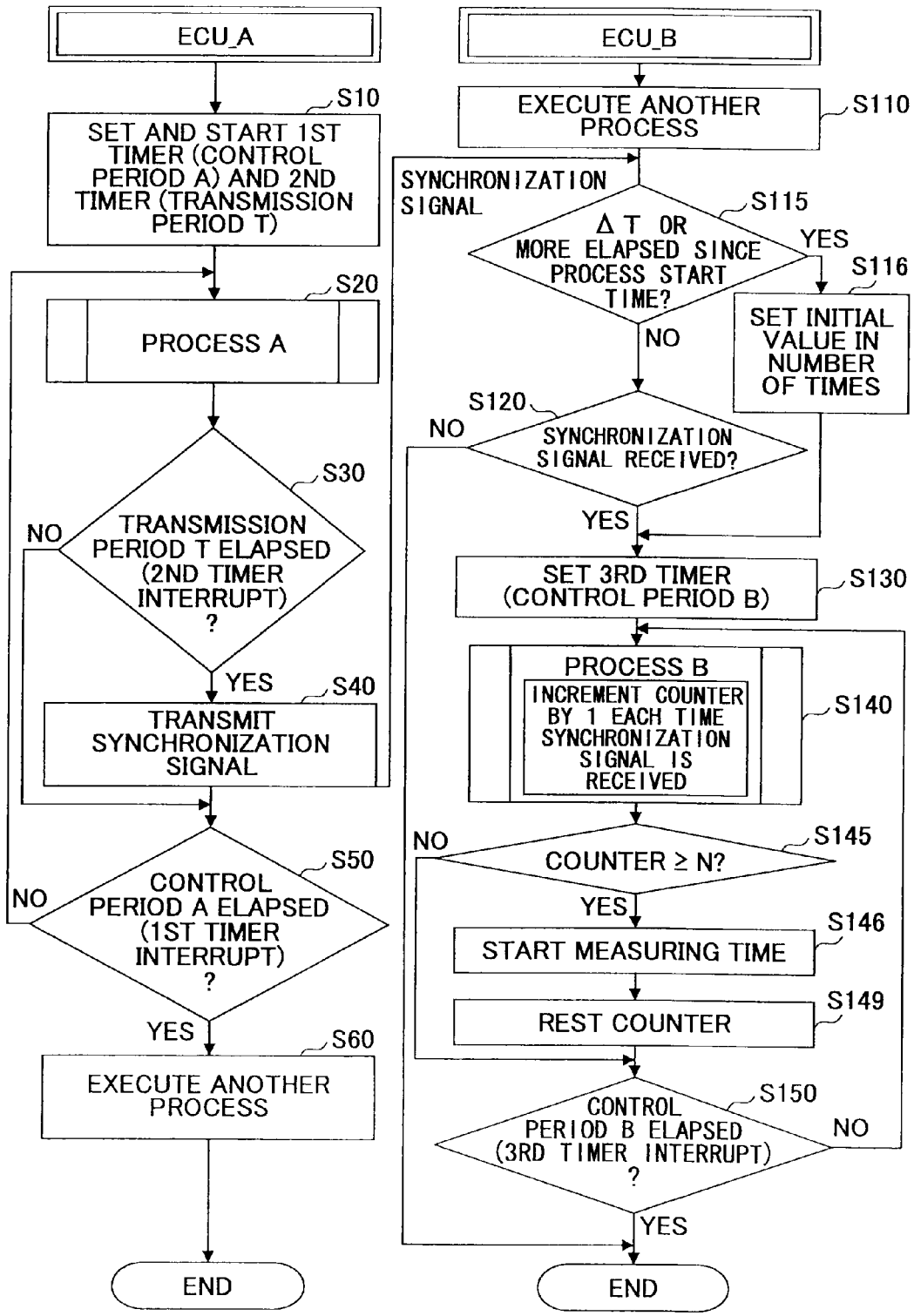
FIG. 13 is an example of a flowchart illustrating a characteristic portion of an operating procedure of the electronic control unit system (Embodiment 3)

FIG. 13 is a flowchart illustrating a characteristic portion of an operating procedure of an electronic control unit system. In FIG. 13, the operating procedure of the ECU_A is the same as in FIG. 6.

The ECU_B executes a process other than the process B until reception of the synchronization signal (S110).

The delay time measuring unit 34 determines whether the measured time, which will be described in step S146, has elapsed from the process start time by $\Delta T$ or more at cycle time intervals, for example (S115). When synchronization signal reception failure occurs, it is unclear whether the synchronization signal has been transmitted from the ECU_A, and it is also unclear whether the synchronization signal has been received. Thus, the delay time measuring unit 34 determines whether the measured time has elapsed since the process start time by $\Delta T$ or more irrespective of reception of the synchronization signal.

When the measured time has not elapsed since the process start time by $\Delta T$ or more ("No" in S115), the synchronization signal is received unless there is reception failure. As in Embodiment 1, upon reception of the synchronization signal from the ECU_A ("Yes" in S120), the synchronization signal receive unit 25 issues an interrupt to the CPU 13B and the CPU 13B executes the process B program. Thus, a third interrupt unit is implemented, and the third timer interrupt unit 26 sets the third timer (control period B) and starts the third timer (S130).

During the execution of the process B, the signal count unit 33 counts the number of times of reception each time the synchronization signal receive unit 25 receives the synchronization signal (S140). Then, it is determined whether the number of times of reception of the synchronization signal is N or more (S145). When the number of times of reception is N or more, the delay time measuring unit 34 is notified. The delay time measuring unit 34 then starts measuring the measured time (S146). The time of the Nth reception is considered to be the time of completion of the process A. The signal count unit 33 resets the counted number of times to zero (S149).

Thereafter, the process B executing unit 27 starts execution of the process B (S140). The process B executing unit 27 repeats the execution of the process B in step S140 before the control period B elapses, i.e., until the third timer issues an interrupt to the CPU 13B ("No" in S150).

Thus, the measuring of the measured time is started from the completion of the process A, and the delay time measuring unit 34 can determine whether the measured time has elapsed since the process start time by ΔT or more in step S115. When the measured time has elapsed since the process start time by ΔT or more ("Yes" in S115), the signal count unit 33 sets a predetermined initial value as the number of times (S116), the third timer is started (S130), and the execution of the process B is started (S140). The predetermined initial value may correspond to the ΔT set. For example, when the number of synchronization signals for which reception failure is permitted is two, the predetermined initial value of the number of times is "2".

Thus, in the electronic control system 100 according to the present embodiment, when the synchronization signal is not received for the duration of time of ΔT or more since the process start time, execution of the process B is started, so that the maximum delay in starting the execution of the process B can be limited to ΔT.

Embodiment 4

Figure 14A:
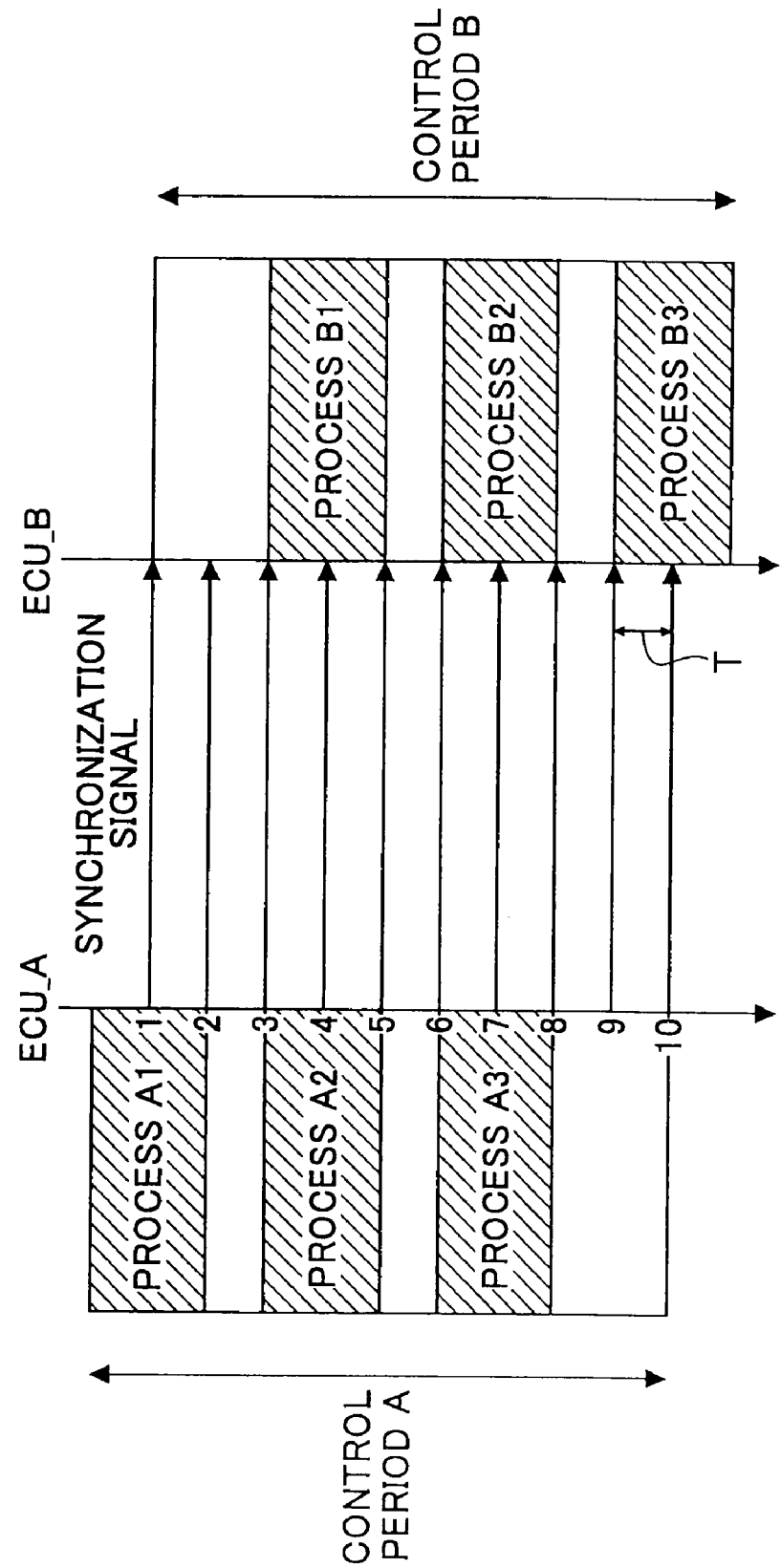
FIG. 14A illustrates an example of a time relationship between a process A and a process B.

Variations of the electronic control system 100 are described. FIG. 14A illustrates an example of the time relationship between the process A and the process B. In the example of FIG. 14A, the process A includes processes A1 through A3, which are sub-processes. The process B includes processes B1 through B3, which are sub-processes. The process A1 is closely related to the process B1; the process A2 is closely related to process B2; and the process A3 is closely related to the process B3.

Thus, execution of the process B1, the process B2, and the process B3 need to be started following the process A1, the process A2, and the process A3, respectively, without delay. The ECU_B can strictly determine the start timing for starting the execution of the processes B1 through B3 by receiving the synchronization signal at transmission periods T which are sufficiently less than the control period A. In this case, execution of the process A1 may be completed within a time on the order of transmission period T×2; execution of the process A2 may be completed within a time on the order of transmission period T×5; and execution of the process A3 may be completed within a time on the order of transmission period T×8. The ECU_B can detect the start timing of the processes B1 through B3 by simply counting the number of the synchronization signals received.

Preferably, the ECU_B may determine the start timing as the time at which the synchronization signal is received for a predetermined number of times by counting the number of times of reception of the synchronization signal, instead of determining the time of reception of the initial synchronization signal as the start timing. FIG. 14B illustrates an example of the time relationship between the process A and the process B. In FIG. 14B, the start timing of the process B corresponds to the time at which the synchronization signal has been received for the fifth time.

Thus, when a design modification is made in the process A program as a result of which the completion of execution of the process A is delayed, the start timing of the process B may be simply shifted. Thus, design modification in the process B can be minimized.

When there is a process C closely related to the process B, the ECU_B may transmit the synchronization signal to the ECU_C so that the ECU_C can determine the start timing of the process C by synchronizing with the process B. FIG. 14C illustrates an example of the time relationship between the process A, the process B, and the process C. The process C determines the reception of the initial synchronization signal from the ECU_B as the start timing. The process A and the process B are executed in a synchronized manner, and the process B and the process C are also executed in a synchronized manner. Thus, the time at which execution of the process C is started with respect to the process A can also be synchronized.

Further, even when there is design modification that affects the timing at which a process result is obtained from the process A, for example, the ECU_B and the ECU_C may simply modify their start timings in accordance with the number of times of reception of the synchronization signal. Thus, the amount of design modification for synchronizing the process B and the process C can be minimized. Thus, the effectiveness of the electronic control system 100 according to the present embodiment increases as the number of the closely related processes increases.

Thus, in the electronic control system 100 according to the present embodiment, the ECU_A transmits the synchronization signal at periods sufficiently less than the control period A. As a result, the ECU_B can start execution of the process B at about the timing as when the synchronization signal is successfully received. Thus, the electronic control system 100 according to the present embodiment is hardly affected by synchronization signal reception failure, in contrast to the case of synchronization control of event-driven types.

When the time ΔT elapses from the process start time which is the time of the synchronization signal that is transmitted initially from the ECU_A, execution of the process B is started even in the absence of reception of the synchronization signal. Thus, the delay can be minimized even when there is synchronization signal reception failure.

Further, when there is design modification in one of closely related processes, the amount of design modification in the other process for synchronization can be minimized.

The invention claimed is:

1. A vehicle electronic control system, comprising:
a first electronic control unit configured to complete execution of a first control process in a predetermined time within a first control period, the first electronic control unit being connected to a second electronic control unit configured to execute a second control process required to execute after the first control process within a second control period substantially corresponding to twice an execution time of the second control process,
wherein the first electronic control unit transmits a synchronization signal at periods of less than the second control period, and
wherein the second electronic control unit starts counting the second control period by using the synchronization signal as a trigger and completes the second control process within the second control period.

2. The vehicle electronic control system according to claim 1, wherein the second electronic control unit starts the second control process within a predetermined time after acquisition of a process result of the first control process following the start of counting of the second control period using the synchronization signal as the trigger.

3. The vehicle electronic control system according to claim 1, wherein the first control process and the second control process are processes that used to be executed by a single electronic control unit.

4. The vehicle electronic control system according to claim 1, wherein the first electronic control unit includes an electronic control unit configured to control a torque of a vehicle drive motor, and wherein the second electronic control unit includes an electronic control unit configured to control an output of an internal combustion engine.

5. The vehicle electronic control system according to claim 1, wherein the first electronic control unit transmits the synchronization signal at periods equal to or less than one tenth the first control period.

6. The vehicle electronic control system according to claim 1, further comprising a third electronic control unit configured to execute a third control process required to execute after the first control process, wherein the first electronic control unit transmits the synchronization signal to the third electronic control unit.

7. The vehicle electronic control system according to claim 6, wherein the second electronic control unit transmits the synchronization signal to the third electronic control unit at periods less than one half the first control period after the start of execution of the second control process, and wherein the third electronic control unit starts execution of the third control process with reference to the synchronization signal received.

8. The vehicle electronic control system according to claim 1, wherein the first electronic control unit and the second electronic control unit are connected via a signal line separately from a communication line.

9. The vehicle electronic control system according to claim 8, wherein the first electronic control unit includes an abnormality detecting unit configured to detect abnormality in the signal line, and wherein the synchronization signal is transmitted via the communication line upon detection of abnormality in the signal line.

10. The vehicle electronic control unit according to claim 1, wherein the second electronic control unit includes a counting unit configured to count a number of times of reception of the synchronization signal, and wherein execution of the second control process is started when the number of times of reception of the synchronization signal since the start of the first control process is equal to or more than a predetermined value.

11. The vehicle electronic control system according to claim 1, wherein the first electronic control unit completes execution of the first control process in a first half of the first control period, and wherein the second electronic control unit starts the second control process after the first half of the second control period elapses and completes the second control process within the second control period.

12. The vehicle electronic control system according to claim 1, wherein the second electronic control unit completes the second control process within the second control period that should have been started if the synchronization signal was received at the start of the first control period, even in the absence of reception of at least one synchronization signal since the start of the first control period.

13. The vehicle control system according to claim 2, wherein the second control process is executed based on the process result of the first control process.

14. The vehicle control system according to claim 1, wherein the first electronic control unit include a plurality of processing cores, the first control process being performed by a first of the plurality of processing cores and the transmission of the synchronization signal is controlled by a second of the plurality of processing cores.

15. The vehicle control system according to claim 8, wherein communication through the communication line is performed using a carrier sense multiple access protocol having collision avoidance (CSMA/CA).

16. The vehicle control system according to claim 15, wherein when the synchronization signal is transmitted via the communication line, the synchronization signal is transmitted via a predefined frame of the CSMA/CA protocol.

17. A vehicle electronic control unit configured to complete execution of a first control process in a predetermined time within a first control period, wherein the vehicle electronic control unit is configured to transmit a synchronization signal to a second vehicle electronic control unit at periods less than one half a second control period, and wherein the second vehicle electronic control unit starts counting the second control period by using the synchronization signal as a trigger and completes a second control process required to execute after the first control process within the second control period.

18. A vehicle electronic control unit connected to a second vehicle electronic control unit configured to complete execution of a first control process in a predetermined time within a first control period, wherein the vehicle electronic control unit is configured to execute a second control process within a second control period equal to or more than an execution time of the second control process, and wherein the vehicle electronic control unit starts counting the second control period by using a synchronization signal transmitted from the second vehicle electronic control unit at periods less than one half the second control period as a trigger, and completes the second control process required to execute after the first control process within the second control period.

19. A control synchronization method for a vehicle electronic control system in which a first electronic control unit configured to complete a first control process in a predetermined time within a first control period is connected to a second electronic control unit configured to execute a second control process required to execute after the first control process within a second control period equal to or more than an execution time of the second control period, the method comprising:

the first electronic control unit transmitting a synchronization signal at periods less than one half the second control period; and the second electronic control unit starting to count the second control period by using the synchronization signal as a trigger and completing the second control process within the second control period.

* * * * *